United States Patent
Cheng et al.

(10) Patent No.: US 10,368,316 B2
(45) Date of Patent: Jul. 30, 2019

(54) COMMUNICATION METHOD AND APPARATUS

(71) Applicant: HUAWEI TECHNOLOGIES CO., LTD., Shenzhen, Guangdong (CN)

(72) Inventors: Xingqing Cheng, Beijing (CN); Hai Wu, Beijing (CN); Qiang Wu, Beijing (CN); Zhengwei Gong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 67 days.

(21) Appl. No.: 15/637,343

(22) Filed: Jun. 29, 2017

(65) Prior Publication Data
US 2017/0303206 A1 Oct. 19, 2017

Related U.S. Application Data

(63) Continuation of application No. PCT/CN2014/095994, filed on Dec. 31, 2014.

(51) Int. Cl.
*H04W 52/24* (2009.01)
*H04W 72/04* (2009.01)
(Continued)

(52) U.S. Cl.
CPC ....... *H04W 52/243* (2013.01); *H04W 52/146* (2013.01); *H04W 52/16* (2013.01);
(Continued)

(58) Field of Classification Search
CPC ............. H04W 52/146; H04W 52/242; H04W 52/243; H04W 52/383; H04W 52/42;
(Continued)

(56) References Cited

U.S. PATENT DOCUMENTS

2007/0291634 A1 12/2007 Kwon et al.
2014/0029562 A1 1/2014 Kishiyama
(Continued)

FOREIGN PATENT DOCUMENTS

| CN | 101375531 A | 2/2009 |
|---|---|---|
| CN | 104158631 A | 11/2014 |
| WO | 2012/161080 A1 | 11/2012 |
| WO | 2011/176042 A1 | 11/2013 |

OTHER PUBLICATIONS

International Search Report, dated Oct. 10, 2015, in International Application No. PCT/CN2014/095994 (4 pp.).
(Continued)

*Primary Examiner* — Charles C Jiang
*Assistant Examiner* — Rosene Clark
(74) *Attorney, Agent, or Firm* — Staas & Halsey LLP

(57) ABSTRACT

A communication method and an apparatus are provided. The method includes: obtaining, by a base station, power parameters of a first user equipment UE and an adjustment parameter $\delta_{1,ue1}$ for a first transmit power; sending, by the base station, the power parameters of the first UE and the adjustment parameter $\delta_{1,ue1}$ for the first transmit power to the first UE; determining, by the base station, the first transmit power according to the power parameters of the first UE and the adjustment parameter $\delta_{1,ue1}$ for the first transmit power; and sending, by the base station, a signal to the first UE at the first transmit power.

14 Claims, 5 Drawing Sheets

(51) Int. Cl.
*H04W 52/16* (2009.01)
*H04W 52/14* (2009.01)
*H04W 52/38* (2009.01)
*H04W 52/42* (2009.01)
*H04W 72/12* (2009.01)
*H04W 52/28* (2009.01)
*H04W 52/34* (2009.01)
*H04W 52/54* (2009.01)

(52) U.S. Cl.
CPC ....... *H04W 52/242* (2013.01); *H04W 52/383* (2013.01); *H04W 52/42* (2013.01); *H04W 72/04* (2013.01); *H04W 72/12* (2013.01); H04W 52/286 (2013.01); H04W 52/346 (2013.01); H04W 52/54 (2013.01); Y02D 70/00 (2018.01)

(58) Field of Classification Search
CPC ..... H04W 72/04; H04W 72/12; H04W 52/16; H04W 52/286; H04W 52/346; H04W 52/54; H04W 52/04; H04W 72/042; H04W 72/0473; H04W 72/082; Y02D 70/00
See application file for complete search history.

(56) References Cited

U.S. PATENT DOCUMENTS

| 2014/0086166 | A1* | 3/2014 | Lindbom | H04L 5/005 370/329 |
| 2014/0314006 | A1 | 10/2014 | Suh et al. | |
| 2015/0016374 | A1* | 1/2015 | Liang | H04W 52/16 370/329 |
| 2015/0131584 | A1* | 5/2015 | Li | H04J 11/0023 370/329 |
| 2015/0171983 | A1 | 6/2015 | Kusashima | |
| 2016/0037460 | A1* | 2/2016 | Benjebbour | H04L 1/0003 370/329 |
| 2017/0223636 | A1* | 8/2017 | Ogawa | H04W 52/16 |
| 2018/0167888 | A1* | 6/2018 | Ohwatari | H04L 27/2626 |

OTHER PUBLICATIONS

International Search Report dated Oct. 10, 2015 in corresponding International Patent Application No. PCT/CN2014/095994.
"3$^{rd}$ Generation Partnership Project; Technical Specification Group Radio Access Network; Evolved Universal Terrestrial Radio Access (E-UTRA); Physical layer procedures (Release 12), " 3GPP TS 36.213 V12.3.0, Sep. 2014.

* cited by examiner

COMMUNICATION METHOD AND APPARATUS

CROSS-REFERENCE TO RELATED APPLICATIONS

This application is a continuation of International Application No. PCT/CN2014/095994, filed on Dec. 31, 2014, the disclosure of which is hereby incorporated by reference in its entirety.

TECHNICAL FIELD

The present invention relates to the communications field, and in particular, to a communication method and an apparatus.

BACKGROUND

In an existing LTE (Long Term Evolution) system, an OFDMA (orthogonal frequency division multiple access) technology is usually used for downlink. To effectively promote cell-center and cell-edge throughputs, a NOMA (non-orthogonal multiple access) technology is a potential candidate technology. When the NOMA is used for communication, a base station allocates different powers to different user equipments (UE). However, different UEs may use a same frequency resource.

Two or multiple UEs using a same time frequency resource block to communicate with a base station are referred to as paired UEs. For example, when using the NOMA technology, a UE1 and a UE2 use a same time frequency resource block to communicate with a base station, and the UE2 and the UE1 are paired UEs. The base station uses different transmit powers to send signals to the UE1 and the UE2. There is interference between a downlink signal for the UE1 and a downlink signal for the UE2. The downlink generally refers to a direction from a base station to a UE. To effectively extract the downlink signal for the UE1, the UE1 needs to eliminate interference from the downlink signal for the UE2. In the prior art, the UE1 cannot obtain related information of the downlink signal for the UE2, and cannot use the NOMA technology to communicate.

SUMMARY

Embodiments of the present invention provide a communication method and an apparatus, to implement communication by using a NOMA technology.

According to a first aspect, an embodiment of the present invention provides a base station, where the base station serves at least two user equipments UEs, the at least two UEs include a first UE and a second UE, and the base station includes: a processing unit, configured to obtain power parameters of the first UE and an adjustment parameter $\delta_{1,ue1}$ for a first transmit power, where the power parameters of the first UE include a UE-specific parameter $P_{A,ue_1}$ of the first UE, a cell-specific parameter $P_{B,ue_1}$ of the first UE, and a reference signal transmit power of the first UE, and the first transmit power is a transmit power of downlink data for the first UE; and a sending unit, configured to send the power parameters of the first UE and the adjustment parameter $\delta_{1,ue1}$ for the first transmit power to the first UE; where the processing unit is further configured to determine the first transmit power according to the power parameters of the first UE and the adjustment parameter $\delta_{1,ue1}$ for the first transmit power, and the sending unit is further configured to send the downlink data for the first UE at the first transmit power.

According to a second aspect, an embodiment of the present invention provides a communication method, where the method is applied to a communications network including at least two user equipments UEs, the at least two UEs include a first UE and a second UE, and the method includes: obtaining, by a base station, power parameters of the first user equipment UE and an adjustment parameter $\delta_{1,ue1}$ for a first transmit power, where the power parameters of the first UE include a UE-specific parameter $P_{A,ue_1}$ of the first UE, a cell-specific parameter $P_{B,ue_1}$ of the first UE, and a reference signal transmit power of the first UE, and the first transmit power is a transmit power of downlink data for the first UE; sending, by the base station, the power parameters of the first UE and the adjustment parameter $\delta_{1,ue1}$ for the first transmit power to the first UE; determining, by the base station, the first transmit power according to the power parameters of the first UE and the adjustment parameter $\delta_{1,ue1}$ for the first transmit power; and sending, by the base station, a downlink signal for the first UE at the first transmit power.

According to a third aspect, an embodiment of the present invention provides a first user equipment UE, where the first UE communicates with a base station, the base station serves at least two UEs, the at least two UEs include the first UE and a second UE, and the first UE includes:

a receiving unit, configured to receive power parameters of the first UE and an adjustment parameter $\delta_{1,ue1}$ for a first transmit power that are sent by the base station, where the power parameters of the first UE include $P_{A,ue_1}$ of the first UE, a cell-specific parameter $P_{B,ue_1}$ of the first UE, and a reference signal transmit power of the first UE, and the first transmit power is a transmit power of downlink data for the first UE; and a processing unit, configured to: determine the first transmit power according to the power parameters of the first UE and the adjustment parameter $\delta_{1,ue1}$ for the first transmit power, and determine a second transmit power according to the power parameters of the first UE and the first transmit power, where the second transmit power is a transmit power of downlink data for the second UE; where the receiving unit is further configured to receive a signal sent by the base station, where the received signal includes the downlink data for the first UE; and the processing unit is further configured to obtain, according to the first transmit power and the second transmit power, the downlink data for the first UE from the signal received by the receiving unit.

According to a fourth aspect, an embodiment of the present invention provides a communication method, where the method is applied to a communications network including at least two user equipments UEs, the at least two UEs include a first UE and a second UE, and the method includes: receiving, by the first user equipment UE, power parameters of the first UE and an adjustment parameter $\delta_{1,ue1}$ for a first transmit power that are sent by a base station, where the power parameters of the first UE include $P_{A,ue_1}$ of the first UE, a cell-specific parameter $P_{B,ue_1}$ of the first UE, and a reference signal transmit power of the first UE, and the first transmit power is a transmit power of downlink data for the first UE; determining, by the first UE, the first transmit power according to the power parameters of the first UE and the adjustment parameter $\delta_{1,ue1}$ for the first transmit power; determining, by the first UE, a second transmit power according to the power parameters of the first UE and the first transmit power, where the second transmit power is a transmit power of downlink data for the second UE; receiving, by the first UE, a signal sent by the base station, where the received signal includes the downlink data for the first UE; and obtaining, by the first UE, the downlink data for the first UE from the received signal according to the first transmit power and the second transmit power.

According to a fifth aspect, an embodiment of the present invention provides a base station, where the base station serves at least two user equipments UEs, the at least two UEs include a first UE and a second UE, and the base station includes: a processing unit, configured to obtain power parameters of the first UE and power parameters of the second UE, where the power parameters of the first UE include a UE-specific parameter $P_{A,ue_1}$ of the first UE, a cell-specific parameter $P_{B,ue_1}$ of the first UE, and a reference signal transmit power of the first UE, and the power parameters of the second UE include a UE-specific parameter $P_{A,ue_2}$ of the second UE, a cell-specific parameter $P_{B,ue2}$ of the second UE, and a reference signal transmit power of the second UE; and a sending unit, configured to send the power parameters of the first UE and the power parameters of the second UE to the first UE; where the processing unit is further configured to determine a first transmit power according to the power parameters of the first UE, where the first transmit power is a transmit power of downlink data for the first UE; and the sending unit is further configured to send the downlink data for the first UE at the first transmit power.

According to a sixth aspect, an embodiment of the present invention provides a communication method, where the method is applied to a communications network including at least two user equipments UEs, the at least two UEs include a first UE and a second UE, and the method includes: obtaining, by a base station, power parameters of the first user equipment UE and power parameters of the second UE, where the power parameters of the first UE include a UE-specific parameter $P_{A,ue_1}$ of the first UE, a cell-specific parameter $P_{B,ue_1}$ of the first UE, and a reference signal transmit power of the first UE, and the power parameters of the second UE includes a UE-specific parameter $P_{A,ue_2}$ of the second UE, a cell-specific parameter $P_{B,ue2}$ of the second UE, and a reference signal transmit power of the second UE; sending, by the base station, the power parameters of the first UE and the power parameters of the second UE to the first UE; determining, by the base station, a first transmit power according to the power parameters of the first UE, where the first transmit power is a transmit power of downlink data for the first UE; and sending, by the base station, the downlink data for the first UE at the first transmit power.

According to a seventh aspect, an embodiment of the present invention provides a first user equipment UE, where the first UE communicates with a base station, the base station serves at least two UEs, the at least two UEs include the first UE and a second UE, and the first UE includes: a receiving unit, configured to receive power parameters of the first UE and power parameters of the second UE that are sent by the base station, where the power parameters of the first UE include a UE-specific parameter $P_{A,ue_1}$ of the first UE, a cell-specific parameter $P_{B,ue_1}$ of the first UE, and a reference signal transmit power of the first UE, and the power parameters of the second UE include a UE-specific parameter $P_{A,ue_2}$ of the second UE, a cell-specific parameter $P_{B,ue2}$ of the second UE, and a reference signal transmit power of the second UE; and a processing unit, configured to: determine a first transmit power according to the power parameters of the first UE, where the first transmit power is a transmit power of downlink data for the first UE; and determine a second transmit power according to the power parameters of the second UE, where the second transmit power is a transmit power of downlink data for the second UE; where the receiving unit is further configured to receive a signal sent by the base station, where the received signal includes the downlink data for the first UE; and the processing unit is further configured to obtain, according to the first transmit power and the second transmit power, the downlink data for the first UE from the signal received by the receiving unit.

According to an eighth aspect, an embodiment of the present invention provides a communication method, where the method is applied to a communications network including at least two user equipments UEs, the at least two UEs include a first UE and a second UE, and the method includes: receiving, by the first UE, power parameters of the first UE and power parameters of the second UE that are sent by a base station, where the power parameters of the first UE include a UE-specific parameter $P_{A,ue_1}$ of the first UE, a cell-specific parameter $P_{B,ue_1}$ of the first UE, and a reference signal transmit power of the first UE, and the power parameters of the second UE include a UE-specific parameter $P_{A,ue_2}$ of the second UE, a cell-specific parameter $P_{B,ue2}$ of the second UE, and a reference signal transmit power of the second UE; determining, by the first UE, a first transmit power according to the power parameters of the first UE, where the first transmit power is a transmit power of downlink data for the first UE; determining a second transmit power according to the power parameters of the second UE, where the second transmit power is a transmit power of downlink data for the second UE; receiving, by the first UE, a signal sent by the base station, where the received signal includes the downlink data for the first UE; and obtaining, by the first UE, the downlink data for the first UE from the received signal according to the first transmit power and the second transmit power.

In the embodiments of the present invention, the base station obtains the adjustment parameter $\delta_{1,ue1}$ for the first transmit power and the power parameters of the first UE, and sends the adjustment parameter $\delta_{1,ue1}$ for the first transmit power and the power parameters of the first UE to the first UE. Therefore, the first UE may obtain the first transmit power according to the power parameters of the first user equipment UE, and determine the second transmit power according to the adjustment parameter $\delta_{1,ue1}$ for the first transmit power and the first transmit power. The first UE can eliminate interference from the downlink data for the second UE according to the second transmit power, to implement communication by using a NOMA technology.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A UE in the embodiments of the present invention may be, for example, a cellular phone, a cordless phone, a SIP (Session Initiation Protocol) phone, a WLL (wireless local loop) station, a PDA (personal digital assistant), a handheld device having a wireless communication function, an in-vehicle device, a wearable device, a computing device, or another processing device connected to a wireless modem.

A base station in the embodiments of the present invention may be, for example, a device that communicates with a wireless terminal over an air interface in an access network by using one or more sectors. The base station may be configured to mutually convert a received over-the-air frame and an Internet Protocol (English: Internet Protocol, IP for short) packet and serve as a router between the wireless terminal and a remaining portion of the access network. The remaining portion of the access network may include an IP network. The base station may further coordinate attribute management of the air interface. For example, the base station may be a base station (EBase Transceiver Station, BTS for short) in GSM (Global System for Mobile Communications) or CDMA (Code Division Multiple Access), or a base station (NodeB for short) in WCDMA (Wideband Code Division Multiple Access), or an evolved NodeB (Eevolutional Node B, NodeB or eNB or e-NodeB for short) in LTE, which is not limited in the embodiments of the present invention.

The embodiments of the present invention disclose a communication method and an apparatus. A base station notifies a first UE of related information of a first transmit power and a second transmit power. The first UE obtains the related information of the first transmit power and the second transmit power, so that the first UE eliminates interference from downlink data for a second UE according to the related information of the first transmit power and the second transmit power, to implement communication by using NOMA. The first transmit power is a transmit power of downlink data for the first UE, and the second transmit power is a transmit power of the downlink data for the second UE. Details are provided in the following.

Figure 1:
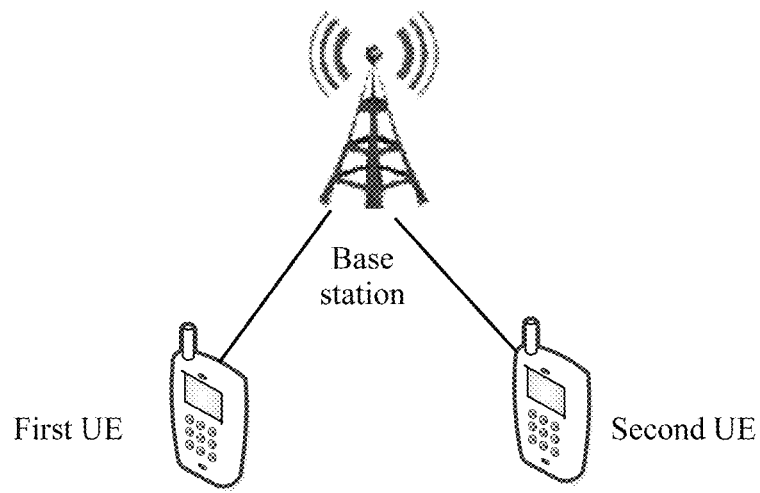
FIG. 1 is a schematic structural diagram of a network architecture according to an embodiment of the present invention.

For ease of understanding of the present invention, a network architecture used in the embodiments of the present invention is first described in the following. Referring to FIG. 1, FIG. 1 is a schematic structural diagram of a network architecture according to an embodiment of the present invention. As shown in FIG. 1, the network includes a base station and UEs. There may be two or more UEs. Only a first UE and a second UE are displayed in the diagram. The first UE and the second UE use a same time frequency resource block to communicate with the base station, and a transmit power of downlink data for the first UE is different from a transmit power of downlink data for the second UE. The base station is any base station in the embodiments of the present invention, and the first UE is any first UE in the embodiments of the present invention.

Figure 2:
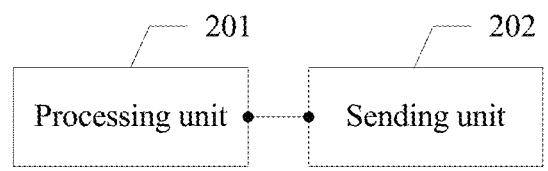
FIG. 2 is a schematic structural diagram of a base station according to Embodiment 1 of the present invention.

Based on the network architecture shown in FIG. 1, Embodiment 1 of the present invention discloses a base station. The base station serves at least two UEs, and the at least two UEs include a first UE and a second UE. Referring to FIG. 2, FIG. 2 is a schematic structural diagram of the base station according to Embodiment 1 of the present invention. As shown in FIG. 2, the base station includes a processing unit 201 and a sending unit 202. The processing unit may be specifically a processor, and the sending unit may be specifically a transmitter.

The processing unit 201 is configured to obtain power parameters of the first UE and an adjustment parameter $\delta_{1,ue1}$ for a first transmit power.

The sending unit 202 is configured to send the power parameters of the first UE and the adjustment parameter $\delta_{1,ue1}$ for the first transmit power to the first UE.

The processing unit 201 is further configured to determine the first transmit power according to the power parameters of the first UE and the adjustment parameter $\delta_{1,ue1}$ for the first transmit power.

The sending unit 202 is further configured to send downlink data for the first UE at the first transmit power.

In this embodiment of the present invention, the power parameters of the first UE include a UE-specific parameter $P_{A,ue_1}$ of the first UE, a cell-specific parameter $P_{B,ue_1}$ of the first UE, and a reference signal transmit power of the first UE. The first transmit power is a transmit power of the downlink data for the first UE.

In an optional implementation, $P_{A,ue_1}$ is a UE-specific parameter, of the first UE, provided by a first higher layer, and $P_{B,ue_1}$ is a cell-specific parameter, of the first UE, provided by the first higher layer. The first higher layer is a higher layer of the first UE, and may be a base station for the first UE or another network entity. For different UEs in a same cell, $P_A$ may vary while $P_B$ as well as a reference signal transmit power remains the same.

In an optional implementation, the sending unit 202 is specifically configured to send the power parameters of the first UE and the adjustment parameter $\delta_{1,ue1}$ for the first transmit power to the first UE by using higher layer signaling or by using downlink control information (DCI) in a physical downlink control channel (PDCCH).

In an optional implementation, the adjustment parameter $\delta_{1,ue1}$ for the first transmit power is an adjustment value for the first transmit power. The processing unit 201 is specifically configured to determine a third transmit power according to the power parameters of the first UE. The first transmit power is obtained after the adjustment value for the first transmit power is subtracted from or added to the third transmit power.

In an optional implementation, the processing unit 201 is specifically configured to: determine $\rho_{ue1}$ according to $P_{A,ue_1}$ and $P_{B,ue_1}$, and determine the third transmit power according to $\rho_{ue1}$ and the reference signal transmit power of the first UE. $\rho_{ue1}$ indicates a ratio of energy per resource element EPRE of a physical downlink shared channel PDSCH of the first UE to EPRE of a cell-specific reference signal of the first UE, $\rho_{ue1}$ includes $\rho_{A,ue1}$ and $\rho_{B,ue1}$, and $\rho_{A,ue1}$ and $\rho_{B,ue1}$ correspond to different orthogonal frequency division multiplexing OFDM symbol indexes of the first UE.

In an optional implementation, the OFDM symbol indexes corresponding to $\rho_{A,ue1}$ and $\rho_{B,ue1}$ are shown in Table 1 or Table 2.

TABLE 1

| A quantity of antenna ports | An OFDM symbol index used by $\rho_{A,ue1}$ in a timeslot | | An OFDM symbol index used by $\rho_{B,ue1}$ in a timeslot | |
| --- | --- | --- | --- | --- |
| | Normal cyclic prefix | Extended cyclic prefix | Normal cyclic prefix | Extended cyclic prefix |
| 1 or 2 | 1, 2, 3, 5, 6 | 1, 2, 4, 5 | 0, 4 | 0, 3 |
| 4 | 2, 3, 5, 6 | 2, 4, 5 | 0, 1, 4 | 0, 1, 3 |

TABLE 2

| A quantity of antenna ports | An OFDM symbol index used by $\rho_{A,ue1}$ in a timeslot | | | | An OFDM symbol index used by $\rho_{B,ue1}$ in a timeslot | | | |
| --- | --- | --- | --- | --- | --- | --- | --- | --- |
| | Normal cyclic prefix | | Extended cyclic prefix | | Normal cyclic prefix | | Extended cyclic prefix | |
| | $n_s$ mod $2 = 0$ | $n_s$ mod $2 = 1$ | $n_s$ mod $2 = 0$ | $n_s$ mod $2 = 1$ | $n_s$ mod $2 = 0$ | $n_s$ mod $2 = 1$ | $n_s$ mod $2 = 0$ | $n_s$ mod $2 = 1$ |
| 1 or 2 | 1, 2, 3, 4, 5, 6 | 0, 1, 2, 3, 4, 5, 6 | 1, 2, 3, 4, 5 | 0, 1, 2, 3, 4, 5 | 0 | — | 0 | — |
| 4 | 2, 3, 4, 5, 6 | 0, 1, 2, 3, 4, 5, 6 | 2, 4, 3, 5 | 0, 1, 2, 3, 4, 5 | 0, 1 | — | 0, 1 | — |

$n_s$ indicates a slot index (in a radio frame.

In an optional implementation, when determining the third transmit power, the processing unit 201 is specifically configured to determine $\rho_{A,ue1}$ according to the following formulas:

The processing unit 201 is specifically configured to determine $\rho_{B,ue1}$ according to $\rho_{A,ue1}$ and Table 3.

TABLE 3

| | $\rho_{B,ue1}/\rho_{A,ue1}$ | |
| --- | --- | --- |
| $P_{B,ue1}$ | One antenna port | Two or four antenna port |
| 0 | 1 | 5/4 |
| 1 | 4/5 | 1 |
| 2 | 3/5 | 3/4 |
| 3 | 2/5 | 1/2 |

In an optional implementation, the sending unit 202 is further configured to use a downlink power offset field in DCI in a PDCCH of the first UE to indicate $\delta_{power\text{-}offset}$. The downlink power offset field may occupy one bit. The first UE learns of $\delta_{power\text{-}offset}$ by using the downlink power offset field. For example, the downlink power offset field may be shown in the following Table 4.

TABLE 4

| Downlink power offset field | $\delta_{power\text{-}offset}$ [dB] |
| --- | --- |
| 0 | $-10\log_{10}(2)$ |
| 1 | 0 |

In an optional implementation, the processing unit 201 determines $\rho_{ue1}$ according to $P_{A,ue_1}$, $P_{B,ue_1}$, and the adjustment parameter $\delta_{1,ue1}$ for the first transmit power, and determines the first transmit power according to $\rho_{ue1}$ and the reference signal transmit power of the first UE. $\rho_{ue1}$ indicates a ratio of energy per resource element EPRE of a physical downlink shared channel PDSCH of the first UE to EPRE of a cell-specific reference signal of the first UE, $\rho_{ue1}$ includes $\rho_{A,ue1}$ and $\rho_{B,ue1}$, and $\rho_{A,ue1}$ and $\rho_{B,ue1}$ correspond to different orthogonal frequency division multiplexing OFDM symbol indexes of the first UE.

$$\rho_{A,ue1} = \begin{cases} \delta_{power\text{-}offset} + P_{A,ue1} + 10\log_{10}(2) & \text{when transmit diversity based on four antenna ports is used for transmission} \\ \delta_{power\text{-}offset} + P_{A,ue1} & \text{when transmit diversity based on four antenna ports is not used for transmission} \end{cases}$$

$$\delta_{power\text{-}offset} = \begin{cases} -10\log_{10}(2) & \text{when multi-user } MU\text{-}MIMO \text{ is used for transmission} \\ 0 \text{ dB} & \text{when multi-user } MU\text{-}MIMO \text{ is not used for transmission} \end{cases}.$$

In an optional implementation, the processing unit 201 is specifically configured to determine $\rho_{A,ue1}$ according to the following formulas:

$$\rho_{A,ue1} = \begin{cases} \delta_{power\text{-}offset} + \delta_{1,ue1} + P_{A,ue1} + 10\log_{10}(2) & \text{when transmit diversity based on four antenna ports is used for transmission;} \\ \delta_{power\text{-}offset} + \delta_{1,ue1} + P_{A,ue1} & \text{when transmit diversity based on four antenna ports is not used for transmission} \end{cases}$$

$$\delta_{power\text{-}offset} = \begin{cases} -10\log_{10}(2) & \text{when multi-user } MU\text{-}MIMO \text{ is used for transmission;} \\ 0 \text{ dB} & \text{when multi-user } MU\text{-}MIMO \text{ is not used for transmission} \end{cases}$$

The processing unit 201 is specifically configured to determine $\rho_{B,ue1}$ according to $\rho_{A,ue1}$ and Table 3.

In another optional implementation, the processing unit 201 is further configured to determine a second transmit power according to the power parameters of the first UE and the first transmit power. The second transmit power is a transmit power of downlink data for the second UE. The sending unit 202 is further configured to send a signal to the second UE at the second transmit power.

In an optional implementation, the processing unit 201 is specifically configured to determine the second transmit power according to the third transmit power and the first transmit power. The third transmit power is determined according to the power parameters of the first UE. For a specific implementation of determining, refer to the foregoing descriptions.

In an optional implementation, the second transmit power is a difference between the third transmit power and the first transmit power.

In Embodiment 1 of the present invention, the processing unit 201 of the base station obtains the adjustment parameter $\delta_{1,ue1}$ for the first transmit power and the power parameters of the first UE, and sends the adjustment parameter $\delta_{1,ue1}$ for the first transmit power and the power parameters of the first UE to the first UE by using the sending unit 202. Therefore, the first UE may obtain the first transmit power according to the power parameters of the first user equipment UE, and determine the second transmit power according to the adjustment parameter $\delta_{1,ue1}$ for the first transmit power and the first transmit power. The first UE can eliminate interference from the downlink data for the second UE according to the second transmit power, to implement communication by using a NOMA technology. The processing unit 201 of the base station obtains the adjustment parameter $\delta_{1,ue1}$ for the first transmit power, and sends the adjustment parameter $\delta_{1,ue1}$ for the first transmit power to the first UE by using the sending unit 202. The base station schedules the first transmit power by using the adjustment parameter $\delta_{1,ue1}$ for the first transmit power, so that dynamic scheduling of a transmit power in the NOMA technology is implemented.

Embodiment 1 may be applied to a scenario in which a power parameter $P_{A,ue_1}$ of a first UE is same as a power parameter $P_{A,ue_2}$ of a second UE. $P_{A,ue_2}$ is a UE-specific parameter, of the second UE, provided by a second higher layer. The second higher layer is a higher layer of the second UE, and may be, for example, a base station for the second UE. In this scenario, because the power parameter $P_{A,ue_1}$ of the first UE is same as the power parameter $P_{A,ue_2}$ of the second UE, it may be considered that transmit powers determined respectively according to power parameters of the first UE and power parameters of the second UE are the same. Therefore, the first UE may obtain the second transmit power according to the power parameters of the first UE. The base station sends the power parameters of the first UE to the first UE, and the first UE can eliminate interference from a signal for the second UE according to the second transmit power, to implement communication by using the NOMA technology.

Figure 3:
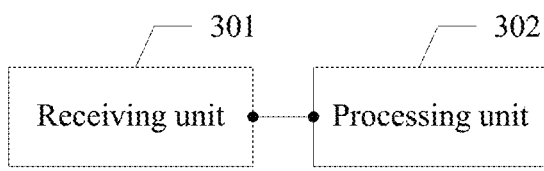
FIG. 3 is a schematic structural diagram of a first UE according to Embodiment 2 of the present invention.

Based on the network architecture shown in FIG. 1, Embodiment 2 of the present invention further discloses a first UE. The first UE communicates with a base station. The base station serves at least two UEs, and the at least two UEs include the first UE and a second UE. FIG. 3 is a schematic structural diagram of the first UE according to Embodiment 2 of the present invention. As shown in FIG. 3, the first UE includes a receiving unit 301 and a processing unit 302. The receiving unit may be specifically a receiver, and the processing unit may be specifically a processor.

The receiving unit 301 is configured to receive power parameters of the first UE and an adjustment parameter $\delta_{1,ue1}$ for a first transmit power that are sent by the base station. The power parameters of the first UE include $P_{A,ue_1}$ of the first UE, a cell-specific parameter $P_{B,ue_1}$ of the first UE, and a reference signal transmit power of the first UE, and the first transmit power is a transmit power of downlink data for the first UE.

The processing unit 302 is configured to: determine the first transmit power according to the power parameters of the first UE and the adjustment parameter $\delta_{1,ue1}$ for the first transmit power, and determine a second transmit power according to the power parameters of the first UE and the first transmit power. The second transmit power is a transmit power of downlink data for the second UE.

The receiving unit 301 is further configured to receive a signal sent by the base station, and the received signal includes the downlink data for the first UE.

The processing unit 302 is further configured to obtain, according to the first transmit power and the second transmit power, the downlink data for the first UE from the signal received by the receiving unit.

For specific meanings of these related parameters in this embodiment of the present invention, refer to descriptions in Embodiment 1.

In an optional implementation, the receiving unit 301 is specifically configured to receive the power parameters of the first UE and the adjustment parameter $\delta_{1,ue1}$ for the first transmit power that are sent by the base station by using higher layer signaling or by using DCI in a PDCCH.

In an optional implementation, the adjustment parameter $\delta_{1,ue1}$ for the first transmit power is an adjustment value for the first transmit power. The processing unit 302 is specifically configured to determine a third transmit power according to the power parameters of the first UE. The first transmit power is obtained after the adjustment value for the first transmit power is subtracted from or added to the third transmit power.

In another optional implementation, the processing unit 302 is specifically configured to: determine $\rho_{ue1}$ according to $P_{A,ue_1}$ and $P_{B,ue_1}$, and determine the third transmit power according to $\rho_{ue1}$ and the reference signal transmit power of the first UE. $\rho_{ue1}$ indicates a ratio of energy per resource element EPRE of a physical downlink shared channel PDSCH of the first UE to EPRE of a cell-specific reference signal of the first UE, $\rho_{ue1}$ includes $\rho_{A,ue1}$ and $\rho_{B,ue1}$, and $\rho_{A,ue1}$ and $\rho_{B,ue1}$ correspond to different orthogonal frequency division multiplexing OFDM symbol indexes of the first UE. For descriptions of these related parameters, refer to Embodiment 1.

In an optional implementation, when determining the third transmit power, the processing unit 302 is specifically configured to determine $\rho_{A,ue1}$ according to the following formulas:

$$\rho_{A,ue1} = \begin{cases} \delta_{power-offset} + P_{A,ue1} + 10\log_{10}(2) & \text{when transmit diversity based on four antenna ports is used for transmission;} \\ \delta_{power-offset} + P_{A,ue1} & \text{when transmit diversity based on four antenna ports is not used for transmission} \end{cases}$$

$$\delta_{power-offset} = \begin{cases} -10\log_{10}(2) & \text{when multi-user } MU\text{-}MIMO \text{ is used for transmission;} \\ 0 \text{ dB} & \text{when multi-user } MU\text{-}MIMO \text{ is not used for transmission} \end{cases}$$

The processing unit 302 is specifically configured to determine $\rho_{B,ue1}$ according to $\rho_{A,ue1}$ and Table 3.

In an optional implementation, the sending unit 301 is further configured to receive an indication $\delta_{power-offset}$ sent by the base station by using a downlink power offset field in DCI in a PDCCH of the first UE. The downlink power offset field may occupy one bit. For example, the downlink power offset field may be shown in the following Table 4.

In an optional implementation, the processing unit 302 is further configured to determine $\rho_{ue1}$ according to $P_{A,ue_1}$, $P_{B,ue_1}$, and the adjustment parameter $\delta_{1,ue1}$ for the first transmit power, and determine the first transmit power according to $\rho_{ue1}$ and the reference signal transmit power of the first UE. $\rho_{ue1}$ indicates a ratio of energy per resource element EPRE of a physical downlink shared channel PDSCH of the first UE to EPRE of a cell-specific reference signal of the first UE, $\rho_{ue1}$ includes $\rho_{A,ue1}$ and $\rho_{B,ue1}$, and $\rho_{A,ue1}$ and $\rho_{B,ue1}$ correspond to different orthogonal frequency division multiplexing OFDM symbol indexes of the first UE.

In an optional implementation, the processing unit 302 is specifically configured to determine $\rho_{A,ue1}$ according to the following formulas:

The processing unit 302 is specifically configured to determine $\rho_{B,ue1}$ according to $\rho_{A,ue1}$ and Table 3.

In an optional implementation, the processing unit 302 is further configured to determine a second transmit power according to the power parameters of the first UE and the first transmit power. The second transmit power is a transmit power of downlink data for the second UE.

In an optional implementation, the processing unit 302 is specifically configured to determine the second transmit power according to the third transmit power and the first transmit power. The third transmit power is determined according to the power parameters of the first UE. For a specific implementation of determining, refer to the foregoing descriptions.

In an optional implementation, the second transmit power is a difference between the third transmit power and the first transmit power.

In an optional implementation, when the first UE obtains the downlink data for the first UE, the first UE needs to use an advanced receiver, such as a maximum likelihood (ML) receiver or a codeword interference cancellation (CWIC) receiver.

When using the maximum likelihood receiver, the first UE may match possible candidate downlink signals of the first UE and the second UE against the received signal, and determine soft information of a bit corresponding to a downlink signal for the first UE. Generally, a downlink signal for the second UE is an interference signal for the first UE. Effectively designing constellation diagrams of the first UE and the second UE may increase a distance of the bit corresponding to the downlink signal for the first UE to an equal effect, so that transmission reliability is promoted. For example, a compound constellation diagram of the first UE and the second UE conforms to Gray mapping or the like. The downlink signal for the first UE carries the downlink data for the first UE.

$$\rho_{A,ue1} = \begin{cases} \delta_{power-offset} + P_{A,ue1} + 10\log_{10}(2) & \text{when transmit diversity based on four antenna ports is used for transmission;} \\ \delta_{power-offset} + P_{A,ue1} & \text{when transmit diversity based on four antenna ports is not used for transmission} \end{cases}$$

$$\delta_{power-offset} = \begin{cases} -10\log_{10}(2) & \text{when multi-user } MU\text{-}MIMO \text{ is used for transmission;} \\ 0 \text{ dB} & \text{when multi-user } MU\text{-}MIMO \text{ is not used for transmission} \end{cases}$$

When using the CWIC receiver, the first UE first obtains a downlink signal for the second UE by means of demodulation, and then obtains a downlink signal for the first UE by subtracting the downlink signal for the second UE from the received signal.

The second UE may consider a downlink signal for the first UE as interference, and directly use an existing common receiver.

For example, it is assumed that a channel coefficient corresponding to the first UE is $H_1$, and noise interference is $\sigma_1$. A channel coefficient corresponding to the second UE is $H_2$, and noise interference is $\sigma_2$. The base station sends a downlink signal $X_1$ for the first UE by using a first transmit power $P_1$, and the base station sends a downlink signal $X_2$ for the second UE on a same time frequency resource by using a second transmit power $P_2$. In this case, signals received by the first UE and the second UE are respectively $Y_1$ and $Y_2$, which are respectively indicated as:

$$Y_1 = \sqrt{P_1}H_1X_1 + \sqrt{P_2}H_1X_2 + \sigma_1$$

$$Y_2 = \sqrt{P_1}H_2X_1 + \sqrt{P_2}H_2X_2 + \sigma_2.$$

The first UE receives the receiving signal $Y_1$, and first obtains the channel $H_1$ and the interference $\sigma_1$ respectively by using channel estimation and noise estimation. Then the first UE obtains the downlink signal $X_2$ for the second UE at first. Finally, the first UE may obtain the downlink signal $X_1$ for the first UE according to the foregoing formulas.

It should be noted that, in the foregoing process of resolving the downlink signal $X_1$ for the first UE, the first UE can first resolve $X_2$, and then subtract $X_2$ to obtain more accurately estimated $X_1$, and this is because a signal-to-noise ratio of the first UE is higher than that of the second UE. Therefore, the first UE can correctly resolve the downlink signal $X_2$ for the second UE. For the second UE, because the downlink signal $X_1$ for the second UE cannot be correctly resolved, $X_2$ is directly resolved only according to the following formula:

$$Y_2 = \sqrt{P_2}H_2X_2 + (\sqrt{P_1}H_2X_1 + \sigma_2).$$

In Embodiment 2 of the present invention, the receiving unit 301 of the first UE receives the power parameters of the first UE and the adjustment parameter $\delta_{1,ue1}$ for the first transmit power that are sent by the base station. The processing unit 302 of the first UE obtains the first transmit power according to the power parameters of the first user equipment UE, and determines the second transmit power according to the power parameters of the first UE and the first transmit power. The first UE can eliminate interference from a signal for the second UE according to the second transmit power, to implement communication by using a NOMA technology.

Embodiment 2 of the present invention may be applied to a scenario in which a power parameter $P_{A,ue_1}$ of a first UE is same as a power parameter $P_{A,ue_2}$ of a second UE. $P_{A,ue_2}$ is a UE-specific parameter, of the second UE, provided by a second higher layer. The second higher layer is a higher layer of the second UE, and may be, for example, a base station for the second UE. In this scenario, because the power parameter $P_{A,ue_1}$ of the first UE is same as the power parameter $P_{A,ue_2}$ of the second UE, it may be considered that transmit powers determined respectively according to power parameters of the first UE and power parameters of the second UE are the same. Therefore, the first UE may obtain the second transmit power according to the power parameters of the first UE. The base station sends the power parameters of the first UE to the first UE, and the first UE can eliminate interference from a signal for the second UE according to the second transmit power, to implement communication by using the NOMA technology.

Figure 4:
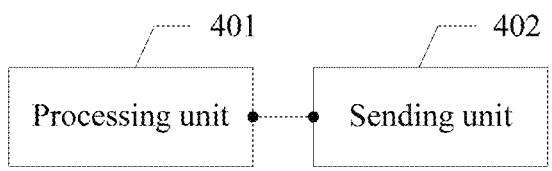
FIG. 4 is a schematic structural diagram of a base station according to Embodiment 3 of the present invention.

Based on the network architecture shown in FIG. 1, Embodiment 3 of the present invention further discloses a base station. The base station serves at least two UEs, and the at least two UEs include a first UE and a second UE. Referring to FIG. 4, FIG. 4 is a schematic structural diagram of the base station according to Embodiment 3 of the present invention. As shown in FIG. 4, the base station includes a processing unit 401 and a sending unit 402. The processing unit may be specifically a processor, and the sending unit may be specifically a transmitter.

The processing unit 401 is configured to obtain power parameters of the first UE and power parameters of the second UE. The power parameters of the first UE include a UE-specific parameter $P_{A,ue_1}$ of the first UE, a cell-specific parameter $P_{B,ue_1}$ of the first UE, and a reference signal transmit power of the first UE, and the power parameters of the second UE include a UE-specific parameter $P_{A,ue_2}$ of the second UE, a cell-specific parameter $P_{B,ue2}$ of the second UE, and a reference signal transmit power of the second UE.

The sending unit 402 is configured to send the power parameters of the first UE and the power parameters of the second UE to the first UE.

The processing unit 401 is further configured to determine a first transmit power according to the power parameters of the first UE, and the first transmit power is a transmit power of downlink data for the first UE.

The sending unit 402 is further configured to send the downlink data for the first UE at the first transmit power.

For meanings of the power parameters of the first UE in this embodiment of the present invention, refer to Embodiment 1.

$P_{A,ue_2}$ is a UE-specific parameter, of the second UE, provided by a second higher layer, and $P_{B,ue2}$ is a cell-specific parameter, of the second UE, provided by the second higher layer. The second higher layer is a higher layer of the second UE, and may be a base station for the second UE or another network entity. For different UEs in a same cell, $P_A$ may vary while $P_B$ as well as a reference signal transmit power remains the same.

In an optional implementation, the sending unit is specifically configured to send the power parameters of the first UE and the power parameters of the second UE to the first UE by using higher layer signaling or by using DCI in a PDCCH.

In an optional implementation, the processing unit 401 determines $\rho_{ue1}$ according to $P_{A,ue_1}$ and $P_{B,ue_1}$, and determines the first transmit power according to $\rho_{ue1}$ and the reference signal transmit power of the first UE. $\rho_{ue1}$ indicates a ratio of energy per resource element EPRE of a physical downlink shared channel PDSCH of the first UE to EPRE of a cell-specific reference signal of the first UE, $\rho_{ue1}$ includes $\rho_{A,ue1}$ and $\rho_{B,ue1}$, and $\rho_{A,ue1}$ and $\rho_{B,ue1}$ correspond to different orthogonal frequency division multiplexing OFDM symbol indexes of the first UE.

In an optional implementation, the processing unit 401 specifically determines $\rho_{A,ue1}$ according to the following formulas:

$$\rho_{A,ue1} = \begin{cases} \delta_{power-offset} + P_{A,ue1} + 10\log_{10}(2) & \text{when transmit diversity based on four} \\ & \text{antenna ports is used for transmission;} \\ \delta_{power-offset} + P_{A,ue1} & \text{when transmit diversity based on four} \\ & \text{antenna ports is not used for transmission} \end{cases}$$

$$\delta_{power-offset} = \begin{cases} -10\log_{10}(2) & \text{when multi-user } MU\text{-}MIMO \text{ is used for transmission;} \\ 0 \text{ dB} & \text{when multi-user } MU\text{-}MIMO \text{ is not used for transmission} \end{cases}$$

The processing unit 401 is specifically configured to determine $\rho_{B,ue1}$ according to $\rho_{A,ue1}$ and Table 3.

In an optional implementation, the sending unit 402 is further configured to use a downlink power offset field in DCI in a PDCCH of the first UE to indicate $\delta_{power-offset}$. The downlink power offset field may occupy one bit. The first UE learns of $\delta_{power-offset}$ by using the downlink power offset field. For example, the downlink power offset field may be shown in the following Table 4.

In an optional implementation, the processing unit 401 is further configured to determine a second transmit power according to the power parameters of the second UE. The second transmit power is a transmit power of downlink data for the second UE. The sending unit 402 is further configured to send the downlink data for the second UE at the second transmit power.

In an optional implementation, the processing unit 402 is specifically configured to: determine $\rho_{ue2}$ according to $P_{A,ue_2}$ and $P_{B,ue2}$, and determine the second transmit power according to $\rho_{ue2}$ and the reference signal transmit power of the second UE. $\rho_{ue2}$ indicates a ratio of energy per resource element EPRE of a physical downlink shared channel PDSCH of the second UE to EPRE of a cell-specific reference signal of the second UE, $\rho_{ue2}$ includes $\rho_{A,ue2}$ and $\rho_{B,ue2}$, and $\rho_{A,ue2}$ and $\rho_{B,ue2}$ correspond to different orthogonal frequency division multiplexing OFDM symbol indexes of the second UE.

In an optional implementation, the OFDM symbol indexes corresponding to $\rho_{A,ue2}$ and $\rho_{B,ue2}$ are shown in Table 5 or Table 6.

TABLE 5

| A quantity of antenna ports | An OFDM symbol index used by $\rho_{A,ue2}$ in a timeslot | | An OFDM symbol index used by $\rho_{B,ue2}$ in a timeslot | |
|---|---|---|---|---|
| | Normal cyclic prefix | Extended cyclic prefix | Normal cyclic prefix | Extended cyclic prefix |
| 1 or 2 | 1, 2, 3, 5, 6 | 1, 2, 4, 5 | 0, 4 | 0, 3 |
| 4 | 2, 3, 5, 6 | 2, 4, 5 | 0, 1, 4 | 0, 1, 3 |

TABLE 6

| A quantity of antenna ports | An OFDM symbol index used by $\rho_{A,ue2}$ in a timeslot | | | | An OFDM symbol index used by $\rho_{B,ue2}$ in a timeslot | | | |
|---|---|---|---|---|---|---|---|---|
| | Normal cyclic prefix | | Extended cyclic prefix | | Normal cyclic prefix | | Extended cyclic prefix | |
| | $n_s$ mod 2 = 0 | $n_s$ mod 2 = 1 | $n_s$ mod 2 = 0 | $n_s$ mod 2 = 1 | $n_s$ mod 2 = 0 | $n_s$ mod 2 = 1 | $n_s$ mod 2 = 0 | $n_s$ mod 2 = 1 |
| 1 or 2 | 1, 2, 3, 4, 5, 6 | 0, 1, 2, 3, 4, 5, 6 | 1, 2, 3, 4, 5 | 0, 1, 2, 3, 4, 5 | 0 | — | 0 | — |
| 4 | 2, 3, 4, 5, 6 | 0, 1, 2, 3, 4, 5, 6 | 2, 4, 3, 5 | 0, 1, 2, 3, 4, 5 | 0, 1 | — | 0, 1 | — |

$n_s$ indicates a slot index in a radio frame.

In an optional implementation, the processing unit 402 is specifically configured to determine $\rho_{A,ue2}$ according to the following formulas:

$$\rho_{A,ue2} = \begin{cases} \delta_{power-offset} + P_{A,ue2} + 10\log_{10}(2) & \text{when transmit diversity based on four} \\ & \text{antenna ports is used for transmission;} \\ \delta_{power-offset} + P_{A,ue2} & \text{when transmit diversity based on four} \\ & \text{antenna ports is not used for transmission} \end{cases}$$

-continued $$\delta_{power-offset} = \begin{cases} -10\log_{10}(2) & \text{when multi-user } MU\text{-}MIMO \text{ is used for transmission} \\ 0 \text{ dB} & \text{when multi-user } MU\text{-}MIMO \text{ is not used for transmission} \end{cases}.$$

The processing unit 402 is specifically configured to determine $\rho_{B,ue2}$ according to $\rho_{A,ue2}$ and Table 3.

In Embodiment 3 of the present invention, the processing unit 401 of the base station obtains the power parameters of the first UE and the power parameters of the second UE, and sends the power parameters of the first UE and the power parameters of the second UE to the first UE by using the sending unit 402, so that the first UE may obtain the first transmit power according to the power parameters of the first UE, and determine the second transmit power according to the power parameters of the second UE. The first UE can eliminate interference from a signal for the second UE according to the second transmit power, to implement communication by using a NOMA technology.

Embodiment 4 of the present invention further discloses a base station. A difference between Embodiment 4 and Embodiment 3 lies in that the processing unit 401 is further configured to obtain an adjustment parameter $\delta_{1,ue1}$ for the first transmit power, and the sending unit 402 is further configured to send the adjustment parameter $\delta_{1,ue1}$ for the first transmit power to the first UE. For meanings of these related parameters, refer to Embodiment 1.

In an optional implementation, the sending unit 402 is specifically configured to send the adjustment parameter $\delta_{1,ue1}$ for the first transmit power to the first UE by using higher layer signaling or by using DCI in a PDCCH.

In this embodiment, the processing unit 401 is specifically configured to determine the first transmit power according to the power parameters of the first UE and the adjustment parameter $\delta_{1,ue1}$ for the first transmit power.

In an optional implementation, the adjustment parameter $\delta_{1,ue1}$ for the first transmit power is an adjustment value for the first transmit power. The processing unit 401 is specifically configured to determine a third transmit power according to the power parameters of the first UE. The first transmit power is obtained after the adjustment value for the first transmit power is subtracted from or added to the third transmit power. For a manner of determining the third transmit power by the processing unit 401, refer to processing by the processing unit 201 in Embodiment 1. Details are not described herein again.

In an optional implementation, the processing unit 401 is specifically configured to determine $\rho_{ue1}$ according to $P_{A,ue_1}$, $P_{B,ue_1}$, and the adjustment parameter $\delta_{1,ue1}$ for the first transmit power, and determine the first transmit power according to $\rho_{ue1}$ and the reference signal transmit power of the first UE. $\rho_{ue1}$ indicates a ratio of energy per resource element EPRE of a physical downlink shared channel PDSCH of the first UE to EPRE of a cell-specific reference signal of the first UE, $\rho_{ue1}$ includes $\rho_{A,ue1}$ and $\rho_{B,ue1}$, and $\rho_{A,ue1}$ and $\rho_{B,ue1}$ correspond to different orthogonal frequency division multiplexing OFDM symbol indexes of the first UE. For a specific process for determining $\rho_{A,ue1}$ and $\rho_{B,ue1}$ by the processing unit 401, refer to descriptions of the processing unit 201 in Embodiment 1.

In Embodiment 4 of the present invention, the processing unit 401 of the base station obtains the adjustment parameter $\delta_{1,ue1}$ for the first transmit power, and sends the adjustment parameter $\delta_{1,ue1}$ for the first transmit power to the first UE by using the sending unit 402. The base station schedules the first transmit power by using the adjustment parameter $\delta_{1,ue1}$ for the first transmit power, so that dynamic scheduling of a transmit power in the NOMA technology is implemented.

Embodiment 5 of the present invention further discloses a base station. A difference between Embodiment 5 and Embodiment 3 or Embodiment 4 lies in that the processing unit 401 is further configured to obtain an adjustment parameter $\delta_{1,ue2}$ for the second transmit power, and the sending unit 402 is further configured to send the adjustment parameter $\delta_{1,ue2}$ for the second transmit power to the first UE.

In an optional implementation, the sending unit 402 is specifically configured to send the adjustment parameter $\delta_{1,ue2}$ for the second transmit power to the first UE by using higher layer signaling or by using DCI in a PDCCH.

In an optional implementation, the processing unit 401 is further configured to determine the second transmit power according to the power parameters of the second UE and the adjustment parameter $\delta_{1,ue2}$ for the second transmit power. The sending unit 402 is further configured to send the downlink data for the second UE at the second transmit power.

In an optional implementation, the adjustment parameter $\delta_{1,ue2}$ for the second transmit power is an adjustment value for the second transmit power. The processing unit 401 is specifically configured to determine a fourth transmit power according to the power parameters of the second UE. The second transmit power is obtained after the adjustment value for the second transmit power is subtracted from or added to the fourth transmit power.

In an optional implementation, the processing unit 401 is specifically configured to: determine $\rho_{ue2}$ according to $P_{A,ue2}$ and $P_{B,ue2}$, and determine the fourth transmit power according to $\rho_{ue2}$ and the reference signal transmit power of the second UE. $\rho_{ue2}$ indicates a ratio of energy per resource element EPRE of a physical downlink shared channel PDSCH of the second UE to EPRE of a cell-specific reference signal of the second UE, $\rho_{ue2}$ includes $\rho_{A,ue2}$ and $\rho_{B,ue2}$, and $\rho_{A,ue2}$ and $\rho_{B,ue2}$ correspond to different orthogonal frequency division multiplexing OFDM symbol indexes of the second UE.

In an optional implementation, for meanings of $\rho_{A,ue2}$ and $\rho_{B,ue2}$ for determining the fourth transmit power, refer to Embodiment 3. For a determining manner of $\rho_{A,ue2}$ and $\rho_{B,ue2}$ refer to descriptions in Embodiment 3. Details are not described herein again.

In another optional implementation, the processing unit 401 is specifically configured to determine $\rho_{ue2}$ according to $P_{A,ue_2}$, $P_{B,ue_2}$, and the adjustment parameter $\delta_{1,ue2}$ for the second transmit power, and determine the second transmit power according to $\rho_{ue2}$ and the reference signal transmit power of the second UE. $\rho_{ue2}$ indicates a ratio of energy per resource element EPRE of a physical downlink shared channel PDSCH of the second UE to EPRE of a cell-specific reference signal of the second UE, $\rho_{ue2}$ includes $\rho_{A,ue2}$ and $\rho_{B,ue2}$, and $\rho_{A,ue2}$ and $\rho_{B,ue2}$ correspond to different orthogonal frequency division multiplexing OFDM symbol indexes of the second UE.

In an implementation, the processing unit 401 is specifically configured to determine $\rho_{A,ue2}$ according to the following formulas:

$$\rho_{A,ue2} = \begin{cases} \delta_{power-offset} + P_{A,ue2} + 10\log_{10}(2) & \text{when transmit diversity based on four} \\ & \text{antenna ports is used for transmission;} \\ \delta_{power-offset} + P_{A,ue2} & \text{when transmit diversity based on four} \\ & \text{antenna ports is not used for transmission} \end{cases}$$

$$\delta_{power-offset} = \begin{cases} -10\log_{10}(2) & \text{when multi-user } MU\text{-}MIMO \text{ is used for transmission;} \\ 0 \text{ dB} & \text{when multi-user } MU\text{-}MIMO \text{ is not used for transmission} \end{cases}$$

The processing unit 401 is specifically configured to determine $\rho_{B,ue2}$ according to $\rho_{A,ue2}$ and Table 3.

In Embodiment 5 of the present invention, the processing unit 401 of the base station obtains the adjustment parameter $\delta_{1,ue2}$ for the second transmit power, and sends the adjustment parameter $\delta_{1,ue2}$ for the second transmit power to the first UE by using the sending unit 402. The base station schedules the transmit power by using the adjustment parameter $\delta_{1,ue2}$ for the second transmit power, so that dynamic scheduling of a transmit power in the NOMA technology is implemented.

Figure 5:
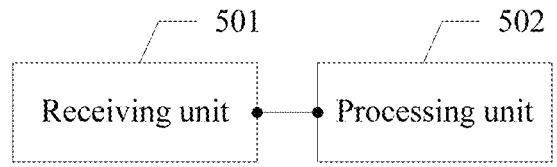
FIG. 5 is a schematic structural diagram of a first UE according to Embodiment 6 of the present invention.
Figure 7:
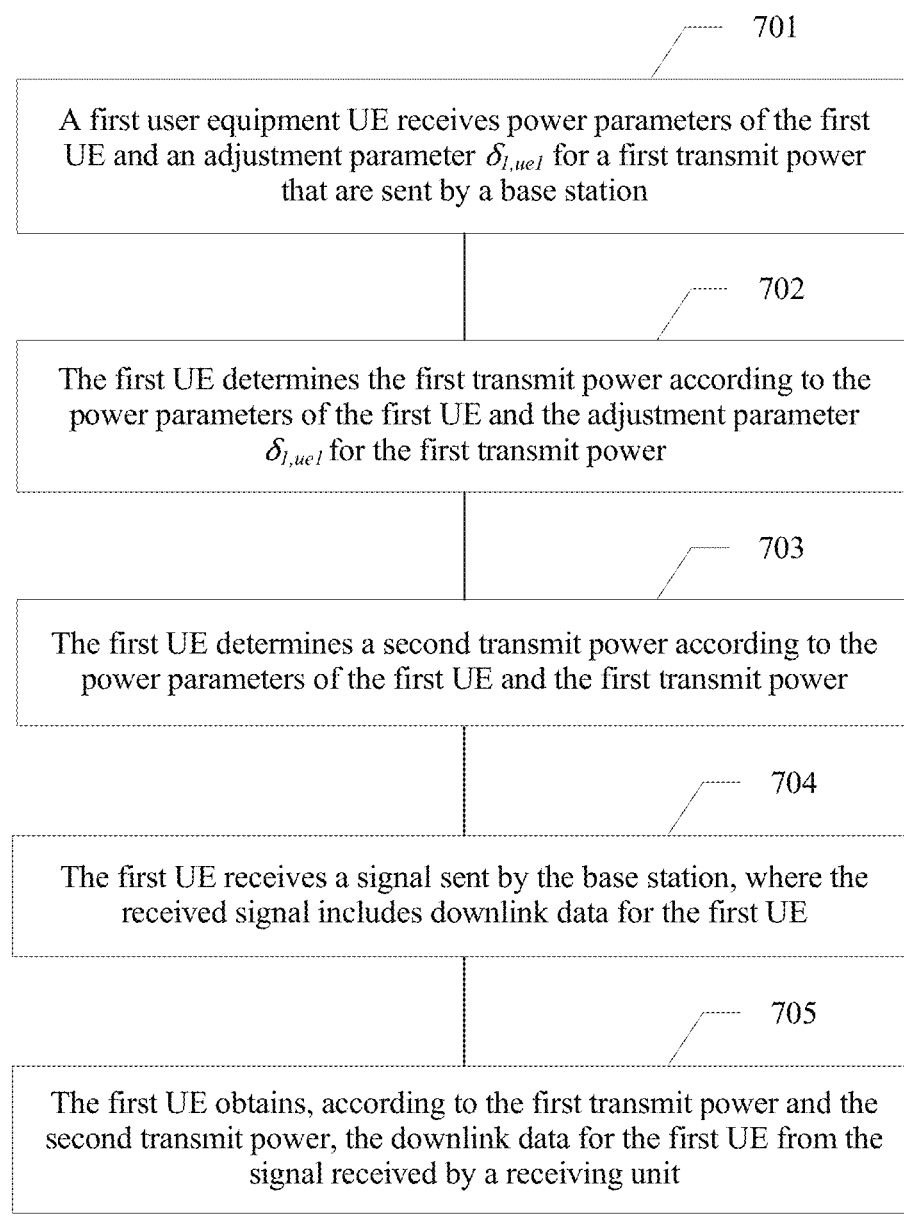
FIG. 7 is a schematic flowchart of a communication method according to Embodiment 10 of the present invention.

Based on the network architecture shown in FIG. 1, Embodiment 6 of the present invention further discloses a first UE. The first UE communicates with a base station. The base station serves at least two UEs, and the at least two UEs include the first UE and a second UE. FIG. 5 is a schematic structural diagram of the first UE according to Embodiment 6 of the present invention. As shown in FIG. 7, the first UE includes a receiving unit 501 and a processing unit 502. The receiving unit may be specifically a receiver, and the processing unit may be specifically a processor.

The receiving unit 501 is configured to receive power parameters of the first UE and power parameters of the second UE that are sent by the base station. The power parameters of the first UE include a UE-specific parameter $P_{A,ue_1}$ of the first UE, a cell-specific parameter $P_{B,ue_1}$ of the first UE, and a reference signal transmit power of the first UE. The power parameters of the second UE include a UE-specific parameter $P_{A,ue_2}$ of the second UE, a cell-specific parameter $P_{B,ue2}$ of the second UE, and a reference signal transmit power of the second UE. For specific meanings of these parameters, refer to descriptions in Embodiment 3.

The processing unit 502 is configured to: determine a first transmit power according to the power parameters of the first UE, where the first transmit power is a transmit power of downlink data for the first UE; and determine a second transmit power according to the power parameters of the second UE, where the second transmit power is a transmit power of downlink data for the second UE.

The receiving unit 501 is further configured to receive a signal sent by the base station, and the received signal includes the downlink data for the first UE.

The processing unit 502 is further configured to obtain, according to the first transmit power and the second transmit power, the downlink data for the first UE from the signal received by the receiving unit.

In an optional implementation, the receiving unit 501 is specifically configured to receive the power parameters of the first UE and the power parameters of the second UE that are sent by the base station by using higher layer signaling or by using DCI in a PDCCH.

In an optional implementation, the processing unit 502 is specifically configured to: determine $\rho_{ue1}$ according to $P_{A,ue_1}$ and $P_{B,ue_1}$, and determine the first transmit power according to $\rho_{ue1}$ and the reference signal transmit power of the first UE. $\rho_{ue1}$ indicates a ratio of energy per resource element EPRE of a physical downlink shared channel PDSCH of the first UE to EPRE of a cell-specific reference signal of the first UE, $\rho_{ue1}$ includes $\rho_{A,ue1}$ and $\rho_{B,ue1}$, and $\rho_{A,ue1}$ and $\rho_{B,ue1}$ correspond to different orthogonal frequency division multiplexing OFDM symbol indexes of the first UE. A specific process is the same as the manner for determining the first transmit power by the processing unit 401 in Embodiment 3. For corresponding descriptions, refer to Embodiment 3. Details are not described herein again.

The processing unit 502 is further configured to determine the second transmit power according to the power parameters of the second UE.

In an optional implementation, the processing unit 502 is specifically configured to: determine $\rho_{ue2}$ according to $P_{A,ue2}$ and $P_{B,ue2}$, and determine the second transmit power according to $\rho_{ue2}$ and the reference signal transmit power of the second UE. $\rho_{ue2}$ indicates a ratio of energy per resource element EPRE of a physical downlink shared channel PDSCH of the second UE to EPRE of a cell-specific reference signal of the second UE, $\rho_{ue2}$ includes $\rho_{A,ue2}$ and $\rho_{B,ue2}$, and $\rho_{A,ue2}$ and $\rho_{B,ue2}$ correspond to different orthogonal frequency division multiplexing OFDM symbol indexes of the second UE. A specific process is the same as the manner for determining the second transmit power by the processing unit 401 in Embodiment 3. For corresponding descriptions, refer to Embodiment 3. Details are not described herein again.

In Embodiment 6 of the present invention, the receiving unit of the first UE receives the power parameters of the first UE and the power parameters of the second UE that are sent by the base station. The processing unit of the first UE may obtain the first transmit power according to the power parameters of the first UE, and determine the second transmit power according to the power parameters of the second UE. The first UE can eliminate interference from the downlink data for the second UE according to the second transmit power, to implement communication by using a NOMA technology.

Embodiment 7 of the present invention further discloses a first UE. A difference between Embodiment 7 and Embodiment 6 lies in that the receiving unit 501 is further configured to receive an adjustment parameter $\delta_{1,ue1}$ for the first transmit power, sent by the base station. The processing unit 502 is specifically configured to determine the first transmit power according to the power parameters of the first UE and the adjustment parameter $\delta_{1,ue1}$ for the first transmit power.

In an optional implementation, the receiving unit 501 is specifically configured to receive the adjustment parameter $\delta_{1,ue1}$, for the first transmit power, sent by the base station by using higher layer signaling or by using downlink control information DCI in a physical downlink control channel PDCCH.

In an optional implementation, the adjustment parameter $\delta_{1,ue1}$ for the first transmit power is an adjustment value for the first transmit power. The processing unit 502 is specifically configured to determine a third transmit power according to the power parameters of the first UE. The first transmit power is obtained after the adjustment value for the first transmit power is subtracted from or added to the third transmit power. For a manner of determining the third transmit power by the processing unit 502, refer to processing by the processing unit 302 in Embodiment 2. Details are not described herein again.

In an optional implementation, the processing unit 502 is specifically configured to determine $\rho_{ue1}$ according to $P_{A,ue_1}$, $P_{B,ue_1}$, and the adjustment parameter $\delta_{1,ue1}$ for the first transmit power, and determine the first transmit power according to $\rho_{ue1}$ and the reference signal transmit power of the first UE. $\rho_{ue1}$ indicates a ratio of energy per resource element EPRE of a physical downlink shared channel PDSCH of the first UE to EPRE of a cell-specific reference signal of the first UE, $\rho_{ue1}$ includes $\rho_{A,ue1}$ and $\rho_{B,ue1}$, and $\rho_{A,ue1}$ and $\rho_{B,ue1}$ correspond to different orthogonal frequency division multiplexing OFDM symbol indexes of the first UE. For a specific process for determining $\rho_{A,ue1}$ and $\rho_{B,ue1}$ by the processing unit 401, refer to descriptions of the processing unit 302 in Embodiment 2. Details are not described herein again.

In Embodiment 7 of the present invention, the receiving unit of the first UE receives the adjustment parameter $\delta_{1,ue1}$, for the first transmit power, sent by the base station. The base station schedules the transmit power by using the adjustment parameter $\delta_{1,ue1}$ for the first transmit power, so that dynamic scheduling of a transmit power in the NOMA technology is implemented.

Embodiment 8 of the present invention further discloses a first UE. A difference between Embodiment 8 and Embodiment 6 or Embodiment 7 lies in that the receiving unit 501 is further configured to receive an adjustment parameter $\delta_{1,ue2}$, for the second transmit power, sent by the base station.

In an optional implementation, the receiving unit 501 is specifically configured to receive the adjustment parameter $\delta_{1,ue2}$, for the second transmit power, sent by the base station by using higher layer signaling or by using DCI in a PDCCH.

In this embodiment, the processing unit 502 is specifically configured to determine the second transmit power according to the power parameters of the second UE and the adjustment parameter $\delta_{1,ue2}$ for the second transmit power.

In an optional implementation, the adjustment parameter $\delta_{1,ue2}$ for the second transmit power is an adjustment value for the second transmit power. The processing unit 502 is specifically configured to determine a fourth transmit power according to the power parameters of the second UE. The second transmit power is obtained after the adjustment value for the second transmit power is subtracted from or added to the fourth transmit power. For a manner of determining the fourth transmit power by the processing unit 502, refer to processing by the processing unit 401 in Embodiment 5. Details are not described herein again.

In an optional implementation, the processing unit 502 is specifically configured to determine $\rho_{ue2}$ according to $P_{A,ue_2}$, $P_{B,ue_2}$, and the adjustment parameter $\delta_{1,ue2}$ for the second transmit power, and determine the second transmit power according to $\rho_{ue2}$ and the reference signal transmit power of the second UE. $\rho_{ue2}$ indicates a ratio of energy per resource element EPRE of a physical downlink shared channel PDSCH of the second UE to EPRE of a cell-specific reference signal of the second UE, $\rho_{ue2}$ includes $\rho_{A,ue2}$ and $\rho_{B,ue2}$, and $\rho_{A,ue2}$ and $\rho_{B,ue2}$ correspond to different orthogonal frequency division multiplexing OFDM symbol indexes of the second UE. For a manner of determining the second transmit power by the processing unit 502, refer to processing by the processing unit 401 in Embodiment 5. Details are not described herein again.

In Embodiment 8 of the present invention, the receiving unit 501 of the first UE receives the adjustment parameter $\delta_{1,ue2}$, for the second transmit power, sent by the base station. The base station schedules the transmit power by using the adjustment parameter $\delta_{1,ue2}$ for the second transmit power, so that dynamic scheduling of a transmit power in the NOMA technology is implemented.

Figure 6:
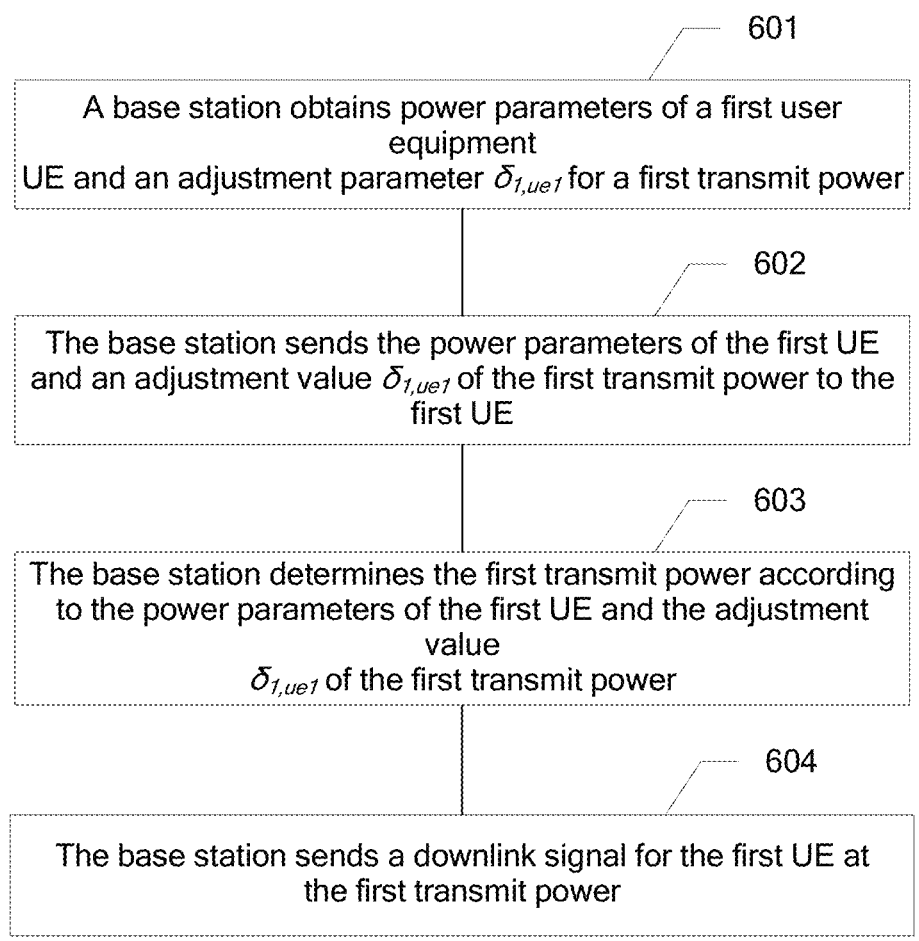
FIG. 6 is a schematic flowchart of a communication method according to Embodiment 9 of the present invention.

Based on the network architecture shown in FIG. 1, Embodiment 9 of the present invention discloses a communication method. The method is applied to a communications network including at least two user equipments UEs. The at least two UEs include a first UE and a second UE. FIG. 6 is a schematic flowchart of the communication method according to Embodiment 9 of the present invention. As shown in FIG. 6, the communication method may include the following steps.

601. A base station obtains power parameters of the first user equipment UE and an adjustment parameter $\delta_{1,ue1}$ for a first transmit power, where the power parameters of the first UE include a UE-specific parameter $P_{A,ue_1}$ of the first UE, a cell-specific parameter $P_{B,ue_1}$ of the first UE, and a reference signal transmit power of the first UE, and the first transmit power is a transmit power of downlink data for the first UE.

602. The base station sends the power parameters of the first UE and the adjustment parameter $\delta_{1,ue1}$ for the first transmit power to the first UE.

603. The base station determines the first transmit power according to the power parameters of the first UE and the adjustment parameter $\delta_{1,ue1}$ for the first transmit power.

604. The base station sends a downlink signal for the first UE at the first transmit power.

For meanings of these related parameters in this embodiment of the present invention, refer to related descriptions in Embodiment 1.

In an optional implementation, the base station sends the power parameters of the first UE and the parameter $\delta_{2,ue1}$ to the first UE by using higher layer signaling or by using DCI in a PDCCH.

In an optional implementation, the adjustment parameter $\delta_{1,ue1}$ for the first transmit power is an adjustment value for the first transmit power. The base station determines a third transmit power according to the power parameters of the first UE. The first transmit power is obtained after the adjustment value for the first transmit power is subtracted from or added to the third transmit power.

In an optional implementation, the base station determines $\rho_{ue1}$ according to $P_{A,ue_1}$ and $P_{B,ue_1}$, and determines the third transmit power according to $\rho_{ue1}$ and the reference signal transmit power of the first UE. $\rho_{ue1}$ indicates a ratio of energy per resource element EPRE of a physical downlink shared channel PDSCH of the first UE to EPRE of a cell-specific reference signal of the first UE, $\rho_{ue1}$ includes $\rho_{A,ue1}$ and $\rho_{B,ue1}$, and $\rho_{A,ue1}$ and $\rho_{B,ue1}$ correspond to different orthogonal frequency division multiplexing OFDM symbol indexes of the first UE.

In an optional implementation, when determining the third transmit power, the base station determines $\rho_{A,ue1}$ according to the following formulas:

$$\rho_{A,ue1} = \begin{cases} \delta_{power-offset} + P_{A,ue1} + 10\log_{10}(2) & \text{when transmit diversity based on four antenna ports is used for transmission;} \\ \delta_{power-offset} + P_{A,ue1} & \text{when transmit diversity based on four antenna ports is not used for transmission} \end{cases}$$

$$\delta_{power-offset} = \begin{cases} -10\log_{10}(2) & \text{when multi-user } MU\text{-}MIMO \text{ is used for transmission;} \\ 0 \text{ dB} & \text{when multi-user } MU\text{-}MIMO \text{ is not used for transmission} \end{cases}$$

The base station determines $\rho_{B,ue1}$ according to $\rho_{A,ue1}$ and Table 3.

In an optional implementation, the base station uses a downlink power offset field in DCI in a PDCCH of the first UE to indicate $\delta_{power-offset}$. The downlink power offset field may occupy one bit. The first UE learns of $\delta_{power-offset}$ by using the downlink power offset field. For example, the downlink power offset field may be shown in the following Table 4.

In an optional implementation, the base station determines $\rho_{ue1}$ according to $P_{A,ue_1}$, $P_{B,ue_1}$, and the adjustment parameter $\delta_{1,ue1}$ for the first transmit power, and determines the first transmit power according to $\rho_{ue1}$ and the reference signal transmit power of the first UE. For meanings of these parameters, refer to Embodiment 1.

In an optional implementation, the base station determines $\rho_{A,ue1}$ according to the following formulas:

$$\rho_{A,ue1} = \begin{cases} \delta_{power-offset} + P_{A,ue1} + 10\log_{10}(2) & \text{when transmit diversity based on four antenna ports is used for transmission;} \\ \delta_{power-offset} + P_{A,ue1} & \text{when transmit diversity based on four antenna ports is not used for transmission} \end{cases}$$

$$\delta_{power-offset} = \begin{cases} -10\log_{10}(2) & \text{when multi-user } MU\text{-}MIMO \text{ is used for transmission;} \\ 0 \text{ dB} & \text{when multi-user } MU\text{-}MIMO \text{ is not used for transmission} \end{cases}$$

The base station determines $\rho_{B,ue1}$ according to $\rho_{A,ue1}$ and Table 3.

In another optional implementation, the base station further determines a second transmit power according to the power parameters of the first UE and the first transmit power. The second transmit power is a transmit power of downlink data for the second UE. The base station sends a signal to the second UE at the second transmit power.

In an optional implementation, the base station determines the second transmit power according to the third transmit power and the first transmit power. The third transmit power is determined according to the power parameters of the first UE. For a specific implementation of determining, refer to the foregoing descriptions.

In an optional implementation, the second transmit power is a difference between the third transmit power and the first transmit power.

In Embodiment 1 of the present invention, the base station obtains the adjustment parameter $\delta_{1,ue1}$ for the first transmit power and the power parameters of the first UE, and sends the adjustment parameter $\delta_{1,ue1}$ for the first transmit power and the power parameters of the first UE to the first UE. Therefore, the first UE may obtain the first transmit power according to the power parameters of the first user equipment UE, and determine the second transmit power according to the adjustment parameter $\delta_{1,ue1}$ for the first transmit power and the first transmit power. The first UE can eliminate interference from the downlink data for the second UE according to the second transmit power, to implement communication by using a NOMA technology. In addition, the base station obtains the adjustment parameter $\delta_{1,ue1}$ for the first transmit power, and sends the adjustment parameter $\delta_{1,ue1}$ for the first transmit power to the first UE. The base station schedules the first transmit power by using the adjustment parameter $\delta_{1,ue1}$ for the first transmit power, so that dynamic scheduling of a transmit power in the NOMA technology is implemented.

An application scenario of Embodiment 9 is consistent with the application scenario of Embodiment 1.

Based on the network architecture shown in FIG. 1, Embodiment 10 of the present invention discloses a communication method. The method is applied to a communications network including at least two user equipments UEs. The at least two UEs include a first UE and a second UE. FIG. 7 is a schematic flowchart of the communication method according to Embodiment 10 of the present invention. As shown in FIG. 7, the communication method may include the following steps.

701. The first user equipment UE obtains power parameters of the first UE and an adjustment parameter $\delta_{1,ue1}$ for a first transmit power that are sent by a base station, where the power parameters of the first UE include $P_{A,ue_1}$ of the first UE, a cell-specific parameter $P_{B,ue_1}$ of the first UE, and a reference signal transmit power of the first UE, and the first transmit power is a transmit power of downlink data for the first UE.

702. The first UE determines the first transmit power according to the power parameters of the first UE and the adjustment parameter $\delta_{1,ue1}$ for the first transmit power.

703. The first UE determines a second transmit power according to the power parameters of the first UE and the first transmit power, where the second transmit power is a transmit power of downlink data for the second UE.

704. The first UE receives a signal sent by the base station, where the received signal includes the downlink data for the first UE.

705. The first UE obtains the downlink data for the first UE from the received signal according to the first transmit power and the second transmit power.

For meanings of these related parameters in this embodiment of the present invention, refer to Embodiment 1.

In an optional implementation, the first UE receives the power parameters of the first UE and the adjustment parameter $\delta_{1,ue1}$ for the first transmit power that are sent by the base station by using higher layer signaling or by using DCI in a PDCCH.

In an optional implementation, the adjustment parameter $\delta_{1,ue1}$ for the first transmit power is an adjustment value for the first transmit power. The first UE determines a third transmit power according to the power parameters of the first UE. The first transmit power is obtained after the adjustment value for the first transmit power is subtracted from or added to the third transmit power.

In another optional implementation, the first UE determines $\rho_{ue1}$ according to $P_{A,ue_1}$ and $P_{B,ue_1}$, and determines the third transmit power according to $\rho_{ue1}$ and the reference signal transmit power of the first UE. $\rho_{ue1}$ indicates a ratio of energy per resource element EPRE of a physical downlink shared channel PDSCH of the first UE to EPRE of a cell-specific reference signal of the first UE, $\rho_{ue1}$ includes $\rho_{A,ue1}$ and $\rho_{B,ue1}$, and $\rho_{A,ue1}$ and $\rho_{B,ue1}$ correspond to different orthogonal frequency division multiplexing OFDM symbol indexes of the first UE. For descriptions of these related parameters, refer to Embodiment 1.

In an optional implementation, when determining the third transmit power, the first UE determines $\rho_{A,ue1}$ according to the following formulas:

$$\rho_{A,ue1} = \begin{cases} \delta_{power-offset} + P_{A,ue1} + 10\log_{10}(2) & \text{when transmit diversity based on four antenna ports is used for transmission,} \\ \delta_{power-offset} + P_{A,ue1} & \text{when transmit diversity based on four antenna ports is not used for transmission} \end{cases}$$

$$\delta_{power-offset} = \begin{cases} -10\log_{10}(2) & \text{when multi-user } MU\text{-}MIMO \text{ is used for transmission,} \\ 0 \text{ dB} & \text{when multi-user } MU\text{-}MIMO \text{ is not used for transmission} \end{cases}$$

The first UE determines $\rho_{B,ue1}$ according to $\rho_{A,ue1}$ and Table 3.

In an optional implementation, the first UE receives an indication $\delta_{power-offset}$ sent by the base station by using a downlink power offset field in DCI in a PDCCH of the first UE. The downlink power offset field may occupy one bit. For example, the downlink power offset field may be shown in the following Table 4.

In an optional implementation, the first UE determines $\rho_{ue1}$ according to $P_{A,ue_1}$, $P_{B,ue_1}$, and the adjustment parameter $\delta_{1,ue1}$ for the first transmit power, and determines the first transmit power according to $\rho_{ue1}$ and the reference signal transmit power of the first UE. $\rho_{ue1}$ indicates a ratio of energy per resource element EPRE of a physical downlink shared channel PDSCH of the first UE to EPRE of a cell-specific reference signal of the first UE, $\rho_{ue1}$ includes $\rho_{A,ue1}$ and $\rho_{B,ue1}$, and $\rho_{A,ue1}$ and $\rho_{B,ue1}$ correspond to different orthogonal frequency division multiplexing OFDM symbol indexes of the first UE.

In an optional implementation, the first UE determines $\rho_{A,ue1}$ according to the following formulas:

$$\rho_{A,ue1} = \begin{cases} \delta_{power-offset} + P_{A,ue1} + 10\log_{10}(2) & \text{when transmit diversity based on four antenna ports is used for transmission,} \\ \delta_{power-offset} + P_{A,ue1} & \text{when transmit diversity based on four antenna ports is not used for transmission} \end{cases}$$

$$\delta_{power-offset} = \begin{cases} -10\log_{10}(2) & \text{when multi-user } MU\text{-}MIMO \text{ is used for transmission,} \\ 0 \text{ dB} & \text{when multi-user } MU\text{-}MIMO \text{ is not used for transmission} \end{cases}$$

The first UE determines $\rho_{B,ue1}$ according to $\rho_{A,ue1}$ and Table 3.

In an optional implementation, the first UE determines the second transmit power according to the power parameters of the first UE and the first transmit power. The second transmit power is the transmit power of the downlink data for the second UE.

In an optional implementation, the first UE determines the second transmit power according to the third transmit power and the first transmit power. The third transmit power is determined according to the power parameters of the first UE. For a specific implementation of determining, refer to the foregoing descriptions.

In an optional implementation, the second transmit power is a difference between the third transmit power and the first transmit power.

In Embodiment 10 of the present invention, the first UE receives the power parameters of the first UE and the adjustment parameter $\delta_{1,ue1}$ for the first transmit power that are sent by the base station. The first UE obtains the first transmit power according to the power parameters of the first user equipment UE, and determines the second transmit power according to the power parameters of the first UE and the first transmit power. The first UE can eliminate interference from a signal for the second UE according to the second transmit power, to implement communication by using a NOMA technology.

An application scenario of Embodiment 10 is consistent with the application scenario of Embodiment 2.

Figure 8:
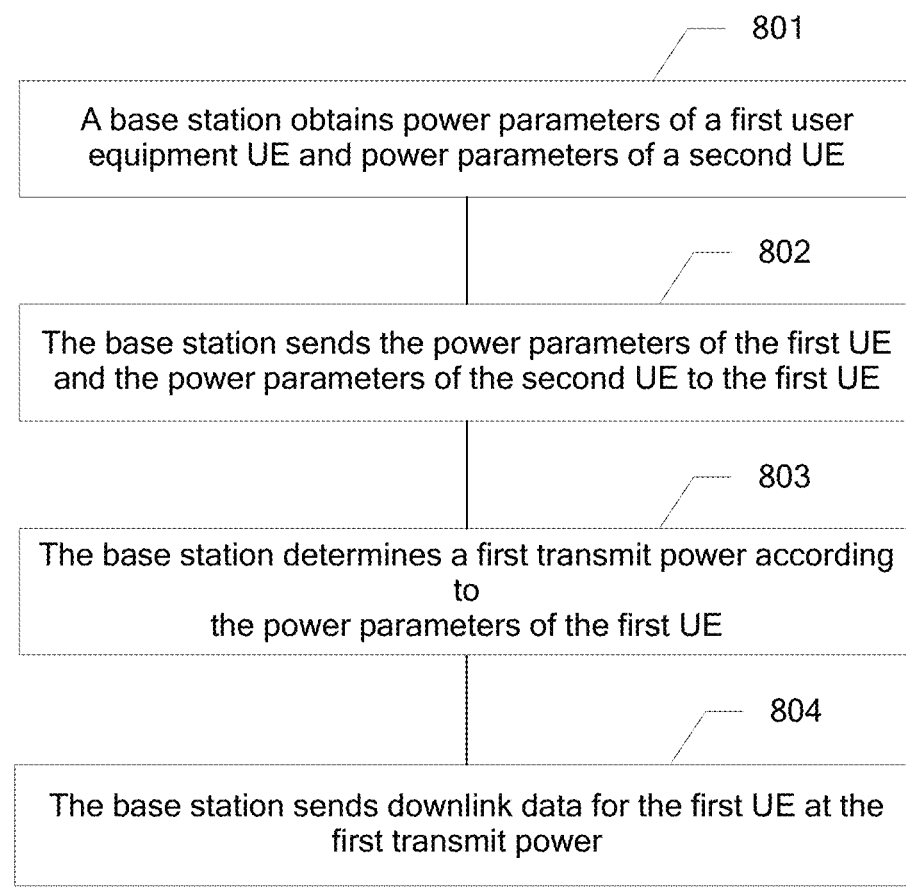
FIG. 8 is a schematic flowchart of a communication method according to Embodiment 11 of the present invention.

Based on the network architecture shown in FIG. 1, Embodiment 11 of the present invention discloses a communication method. The method is applied to a communications network including at least two user equipments UEs. The at least two UEs include a first UE and a second UE. FIG. 8 is a schematic flowchart of the communication method according to Embodiment 11 of the present invention. As shown in FIG. 8, the communication method may include the following steps.

801. A base station obtains power parameters of the first user equipment UE and power parameters of the second UE, where the power parameters of the first UE include a UE-specific parameter $P_{A,ue_1}$ of the first UE, a cell-specific parameter $P_{B,ue_1}$ of the first UE, and a reference signal transmit power of the first UE, and the power parameters of the second UE include a UE-specific parameter $P_{A,ue_2}$ of the second UE, a cell-specific parameter $P_{B,ue2}$ of the second UE, and a reference signal transmit power of the second UE.

802. The base station sends the power parameters of the first UE and the power parameters of the second UE to the first UE.

803. The base station determines a first transmit power according to the power parameters of the first UE, where the first transmit power is a transmit power of downlink data for the first UE.

804. The base station sends the downlink data for the first UE at the first transmit power.

For meanings of these related parameters in this embodiment of the present invention, refer to Embodiment 3.

In an optional implementation, the base station sends the power parameters of the first UE and the power parameters of the second UE to the first UE by using higher layer signaling or by using DCI in a PDCCH.

In an optional implementation, the base station determines $\rho_{ue1}$ according to $P_{A,ue_1}$ and $P_{B,ue_1}$, and determines the first transmit power according to $\rho_{ue1}$ and the reference signal transmit power of the first UE.

In an optional implementation, the base station determines $\rho_{A,ue1}$ according to the following formulas:

$$\rho_{A,ue1} = \begin{cases} \delta_{power\text{-}offset} + P_{A,ue1} + 10\log_{10}(2) & \text{when transmit diversity based on four antenna ports is used for transmission,} \\ \delta_{power\text{-}offset} + P_{A,ue1} & \text{when transmit diversity based on four antenna ports is not used for transmission} \end{cases}$$

$$\delta_{power\text{-}offset} = \begin{cases} -10\log_{10}(2) & \text{when multi-user } MU\text{-}MIMO \text{ is used for transmission,} \\ 0\ dB & \text{when multi-user } MU\text{-}MIMO \text{ is not used for transmission} \end{cases}.$$

The base station determines $\rho_{B,ue1}$ according to $\rho_{A,ue1}$ and Table 3.

In an optional implementation, the base station uses a downlink power offset field in DCI in a PDCCH of the first UE to indicate $\delta_{power\text{-}offset}$. The downlink power offset field may occupy one bit. The first UE learns of $\delta_{power\text{-}offset}$ by using the downlink power offset field. For example, the downlink power offset field may be shown in the following Table 4.

In an optional implementation, the base station determines a second transmit power according to the power parameters of the second UE. The second transmit power is a transmit power of downlink data for the second UE. The base station sends the downlink data for the second UE at the second transmit power.

In an optional implementation, the base station determines $\rho_{ue2}$ according to $P_{A,ue_2}$ and $P_{B,ue2}$, and determines the second transmit power according to $\rho_{ue2}$ and the reference signal transmit power of the second UE. $\rho_{ue2}$ indicates a ratio of energy per resource element EPRE of a physical downlink shared channel PDSCH of the second UE to EPRE of a cell-specific reference signal of the second UE, $\rho_{ue2}$ includes $\rho_{A,ue2}$ and $\rho_{B,ue2}$, and $\rho_{A,ue2}$ and $\rho_{B,ue2}$ correspond to different orthogonal frequency division multiplexing OFDM symbol indexes of the second UE.

In an optional implementation, the OFDM symbol indexes corresponding to $\rho_{A,ue2}$ and $\rho_{B,ue2}$ are shown in Table 5 or Table 6.

In an optional implementation, the base station determines $\rho_{A,ue2}$ according to the following formulas:

$$\rho_{A,ue2} =$$

$$\begin{cases} \delta_{power-offset} + P_{A,ue2} + 10\log_{10}(2) & \text{when transmit diversity based on four antenna ports is used for transmission;} \\ \delta_{power-offset} + P_{A,ue2} & \text{when transmit diversity based on four antenna ports is not used for transmission} \end{cases}$$

$$\delta_{power-offset} =$$

$$\begin{cases} -10\log_{10}(2) & \text{when multi-user } MU\text{-}MIMO \text{ is used for transmission;} \\ 0 \text{ dB} & \text{when multi-user } MU\text{-}MIMO \text{ is not used for transmission} \end{cases}$$

The base station determines $\rho_{B,ue2}$ according to $\rho_{A,ue2}$ and Table 3.

In this embodiment of the present invention, the base station obtains the power parameters of the first UE and the power parameters of the second UE, and sends the power parameters of the first UE and the power parameters of the second UE to the first UE, so that the first UE may obtain the first transmit power according to the power parameters of the first UE, and determine the second transmit power according to the power parameters of the second UE. The first UE can eliminate interference from a signal for the second UE according to the second transmit power, to implement communication by using a NOMA technology.

An application scenario of Embodiment 11 is consistent with the application scenario of Embodiment 1.

Based on the network architecture shown in FIG. 1, Embodiment 12 of the present invention discloses a communication method. A difference between Embodiment 12 and Embodiment 11 lies in that the base station further obtains an adjustment parameter $\delta_{1,ue1}$ for the first transmit power, and sends the adjustment parameter $\delta_{1,ue1}$ for the first transmit power to the first UE. For meanings of these related parameters, refer to Embodiment 1.

In an optional implementation, the base station sends the adjustment parameter $\delta_{1,ue1}$ for the first transmit power to the first UE by using higher layer signaling or by using DCI in a PDCCH.

In this embodiment, the base station determines the first transmit power according to the power parameters of the first UE and the adjustment parameter $\delta_{1,ue1}$ for the first transmit power.

In an optional implementation, the adjustment parameter $\delta_{1,ue1}$ for the first transmit power is an adjustment value for the first transmit power. The base station determines a third transmit power according to the power parameters of the first UE. The first transmit power is obtained after the adjustment value for the first transmit power is subtracted from or added to the third transmit power. For a manner of determining the third transmit power by the base station, refer to processing in Embodiment 9. Details are not described herein again.

In an optional implementation, the base station determines $\rho_{ue1}$ according to $P_{A,ue_1}$, $P_{B,ue_1}$ and the adjustment parameter $\delta_{1,ue1}$ for the first transmit power, and determines the first transmit power according to $\rho_{ue1}$ and the reference signal transmit power of the first UE. $\rho_{ue1}$ indicates a ratio of energy per resource element EPRE of a physical downlink shared channel PDSCH of the first UE to EPRE of a cell-specific reference signal of the first UE, $\rho_{ue1}$ includes $\rho_{A,ue1}$ and $\rho_{B,ue1}$, and $\rho_{A,ue1}$ and $\rho_{B,ue1}$ correspond to different orthogonal frequency division multiplexing OFDM symbol indexes of the first UE. For a specific process for determining $\rho_{A,ue1}$ and $\rho_{B,ue1}$ by the base station, refer to descriptions in Embodiment 9.

In this embodiment of the present invention, the base station obtains the adjustment parameter $\delta_{1,ue1}$ for the first transmit power, and sends the adjustment parameter $\delta_{1,ue1}$ for the first transmit power to the first UE. The base station schedules the first transmit power by using the adjustment parameter $\delta_{1,ue1}$ for the first transmit power, so that dynamic scheduling of a transmit power in a NOMA technology is implemented.

Embodiment 13 of the present invention further discloses a base station. A difference between Embodiment 13 and Embodiment 11 or Embodiment 12 lies in that the base station further obtains an adjustment parameter $\delta_{1,ue2}$ for the second transmit power, and further sends the adjustment parameter $\delta_{1,ue2}$ for the second transmit power to the first UE.

In an optional implementation, the base station sends the adjustment parameter $\delta_{1,ue2}$ for the second transmit power to the first UE by using higher layer signaling or by using DCI in a PDCCH.

In an optional implementation, the base station determines the second transmit power according to the power parameters of the second UE and the adjustment parameter $\delta_{1,ue2}$ for the second transmit power, and is further configured to send the downlink data for the second UE at the second transmit power.

In an optional implementation, the adjustment parameter $\delta_{1,ue2}$ for the second transmit power is an adjustment value for the second transmit power. The base station determines a fourth transmit power according to the power parameters of the second UE. The second transmit power is obtained after the adjustment value for the second transmit power is subtracted from or added to the fourth transmit power.

In an optional implementation, the base station determines $\rho_{ue2}$ according to $P_{A,ue2}$ and $P_{B,ue2}$ and determines the fourth transmit power according to $\rho_{ue2}$ and the reference signal transmit power of the second UE. $\rho_{ue2}$ indicates a ratio of energy per resource element EPRE of a physical downlink shared channel PDSCH of the second UE to EPRE of a cell-specific reference signal of the second UE, $\rho_{ue2}$ includes $\rho_{A,ue2}$ and $\rho_{B,ue2}$, and $\rho_{A,ue2}$ and $\rho_{B,ue2}$ correspond to different orthogonal frequency division multiplexing OFDM symbol indexes of the second UE.

In an optional implementation, for meanings of $\rho_{A,ue2}$ and $\rho_{B,ue2}$ for determining the fourth transmit power, refer to Embodiment 11. For a determining manner of $\rho_{A,ue2}$ and $\rho_{B,ue2}$, refer to descriptions in Embodiment 11. Details are not described herein again.

In another optional implementation, the base station determines $\rho_{ue2}$ according to $P_{A,ue_2}$, $P_{B,ue_2}$, and the adjustment parameter $\delta_{1,ue2}$ for the second transmit power, and determines the second transmit power according to $\rho_{ue2}$ and the reference signal transmit power of the second UE. $\rho_{ue2}$ indicates a ratio of energy per resource element EPRE of a physical downlink shared channel PDSCH of the second UE to EPRE of a cell-specific reference signal of the second UE, $\rho_{ue2}$ includes $\rho_{A,ue2}$ and $\rho_{B,ue2}$, and $\rho_{A,ue2}$ and $\rho_{B,ue2}$ correspond to different orthogonal frequency division multiplexing OFDM symbol indexes of the second UE.

In an implementation, the base station determines $\rho_{A,ue2}$ according to the following formulas:

$$\rho_{A,ue2} = \begin{cases} \delta_{power-offset} + \delta_{1,ue2} + P_{A,ue2} + 10\log_{10}(2) & \text{when transmit diversity based on four antenna ports is used for transmission;} \\ \delta_{power-offset} + \delta_{1,ue2} + P_{A,ue2} & \text{when transmit diversity based on four antenna ports is not used for transmission} \end{cases}$$

$$\delta_{power-offset} = \begin{cases} -10\log_{10}(2) & \text{when multi-user } MU\text{-}MIMO \text{ is used for transmission;} \\ 0 \text{ dB} & \text{when multi-user } MU\text{-}MIMO \text{ is not used for transmission} \end{cases}$$

The base station determines $\rho_{B,ue2}$ according to $\rho_{A,ue2}$ and Table 3.

In Embodiment 13 of the present invention, the base station obtains the adjustment parameter $\delta_{1,ue2}$ for the second transmit power, and sends the adjustment parameter $\delta_{1,ue2}$ for the second transmit power to the first UE. The base station schedules the transmit power by using the adjustment parameter $\delta_{1,ue2}$ for the second transmit power, so that dynamic scheduling of a transmit power in a NOMA technology is implemented.

Figure 9:
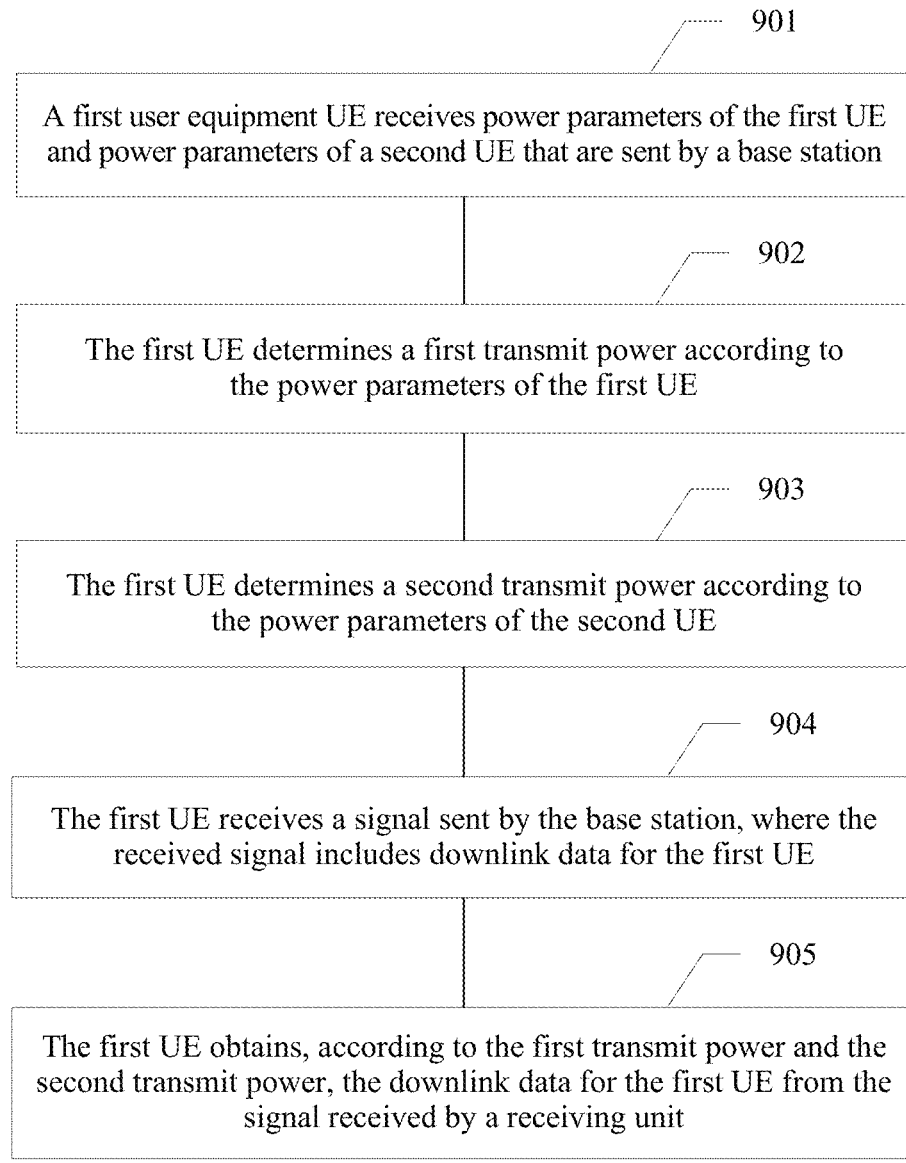
FIG. 9 is a schematic flowchart of a communication method according to Embodiment 14 of the present invention.

Based on the network architecture shown in FIG. 1, Embodiment 14 of the present invention discloses a communication method. The method is applied to a communications network including at least two user equipments UEs. The at least two UEs include a first UE and a second UE. FIG. 9 is a schematic flowchart of the communication method according to Embodiment 14 of the present invention. As shown in FIG. 9, the communication method may include the following steps.

901. The first UE receives power parameters of the first UE and power parameters of the second UE that are sent by a base station, where the power parameters of the first UE include a UE-specific parameter $P_{A,ue_1}$ of the first UE, a cell-specific parameter $P_{B,ue_1}$ of the first UE, and a reference signal transmit power of the first UE, and the power parameters of the second UE include a UE-specific parameter $P_{A,ue_2}$ of the second UE, a cell-specific parameter $P_{B,ue2}$ of the second UE, and a reference signal transmit power of the second UE.

902. The first UE determines a first transmit power according to the power parameters of the first UE, where the first transmit power is a transmit power of downlink data for the first UE.

903. Determines a second transmit power according to the power parameters of the second UE, where the second transmit power is a transmit power of downlink data for the second UE.

904. The first UE receives a signal sent by the base station, where the received signal includes the downlink data for the first UE.

905. The first UE obtains the downlink data for the first UE from the received signal according to the first transmit power and the second transmit power.

In an optional implementation, the first UE receives the power parameters of the first UE and the power parameters of the second UE that are sent by the base station by using higher layer signaling or by using DCI in a PDCCH.

In an optional implementation, the first UE determines $\rho_{ue1}$ according to $P_{A,ue_1}$ and $P_{B,ue_1}$, and determines the first transmit power according to $\rho_{ue1}$ and the reference signal transmit power of the first UE. $\rho_{ue1}$ indicates a ratio of energy per resource element EPRE of a physical downlink shared channel PDSCH of the first UE to EPRE of a cell-specific reference signal of the first UE, $\rho_{ue1}$ includes $\rho_{A,ue1}$ and $\rho_{B,ue1}$, and $\rho_{A,ue1}$ and $\rho_{B,ue1}$ correspond to different orthogonal frequency division multiplexing OFDM symbol indexes of the first UE. A specific process is the same as the manner for determining the first transmit power by the base station in Embodiment 8. For corresponding descriptions, refer to Embodiment 8. Details are not described herein again.

The first UE determines the second transmit power according to the power parameters of the second UE.

In an optional implementation, the first UE determines $\rho_{ue2}$ according to $P_{A,ue2}$ and $P_{B,ue2}$, and determines the second transmit power according to $\rho_{ue2}$ and the reference signal transmit power of the second UE. $\rho_{ue2}$ indicates a ratio of energy per resource element EPRE of a physical downlink shared channel PDSCH of the second UE to EPRE of a cell-specific reference signal of the second UE, $\rho_{ue2}$ includes $\rho_{A,ue2}$ and $\rho_{B,ue2}$, and $\rho_{A,ue2}$ and $\rho_{B,ue2}$ correspond to different orthogonal frequency division multiplexing OFDM symbol indexes of the second UE. A specific process is the same as the manner for determining the second transmit power by the base station in Embodiment 8. For corresponding descriptions, refer to Embodiment 8. Details are not described herein again.

In Embodiment 6 of the present invention, the receiving unit of the first UE receives the power parameters of the first UE and the power parameters of the second UE that are sent by the base station. The processing unit of the first UE may obtain the first transmit power according to the power parameters of the first UE, and determine the second transmit power according to the power parameters of the second UE. The first UE can eliminate interference from the downlink data for the second UE according to the second transmit power, to implement communication by using a NOMA technology.

Embodiment 15 of the present invention further discloses a first UE. A difference between Embodiment 15 and Embodiment 14 lies in that the first UE receives an adjustment parameter $\delta_{1,ue1}$ for the first transmit power, sent by the base station. The first UE determines the first transmit power according to the power parameters of the first UE and the adjustment parameter $\delta_{1,ue1}$ for the first transmit power.

In an optional implementation, the first UE receives the adjustment parameter $\delta_{1,ue1}$, for the first transmit power, sent by the base station by using higher layer signaling or by using downlink control information DCI in a physical downlink control channel PDCCH.

In an optional implementation, the adjustment parameter $\delta_{1,ue1}$ for the first transmit power is an adjustment value for the first transmit power. The first UE determines a third transmit power according to the power parameters of the first UE. The first transmit power is obtained after the adjustment value for the first transmit power is subtracted from or added to the third transmit power. For a manner of determining the third transmit power by the first UE, refer to processing in Embodiment 10. Details are not described herein again.

In an optional implementation, the first UE determines $\rho_{ue1}$ according to $P_{A,ue_1}$, $P_{B,ue_1}$, and the adjustment parameter $\delta_{1,ue1}$ for the first transmit power, and determines the first transmit power according to $\rho_{ue1}$ and the reference signal transmit power of the first UE. $\rho_{ue1}$ indicates a ratio of energy per resource element EPRE of a physical downlink shared channel PDSCH of the first UE to EPRE of a cell-specific reference signal of the first UE, $\rho_{ue1}$ includes $\rho_{A,ue1}$ and $\rho_{B,ue1}$, and $\rho_{A,ue1}$ and $\rho_{B,ue1}$ correspond to different orthogonal frequency division multiplexing OFDM symbol indexes of the first UE. For a specific process for determining $\rho_{A,ue1}$ and $\rho_{B,ue1}$ by the first UE, refer to descriptions in Embodiment 10. Details are not described herein again.

In Embodiment 15 of the present invention, the receiving unit of the first UE receives the adjustment parameter $\delta_{1,ue1}$, for the first transmit power, sent by the base station. The base station schedules the transmit power by using the adjustment parameter $\delta_{1,ue1}$ for the first transmit power, so that dynamic scheduling of a transmit power in a NOMA technology is implemented.

Embodiment 16 of the present invention further discloses a first UE. A difference between Embodiment 16 and Embodiment 14 or Embodiment 15 lies in that the first UE receives an adjustment parameter $\delta_{1,ue2}$, for the second transmit power, sent by the base station.

In an optional implementation, the first UE receives the adjustment parameter $\delta_{1,ue2}$, for the second transmit power, sent by the base station by using higher layer signaling or by using DCI in a PDCCH.

In this embodiment, the first UE determines the second transmit power according to the power parameters of the second UE and the adjustment parameter $\delta_{1,ue2}$ for the second transmit power.

In an optional implementation, the adjustment parameter $\delta_{1,ue2}$ for the second transmit power is an adjustment value for the second transmit power. The first UE determines a fourth transmit power according to the power parameters of the second UE. The second transmit power is obtained after the adjustment value for the second transmit power is subtracted from or added to the fourth transmit power. For a manner of determining the fourth transmit power by the first UE, refer to processing in Embodiment 13. Details are not described herein again.

In an optional implementation, the first UE determines $\rho_{ue2}$ according to $P_{A,ue_2}$, $P_{B,ue_2}$, and the adjustment parameter $\delta_{1,ue2}$ for the second transmit power, and determines the second transmit power according to $\rho_{ue2}$ and the reference signal transmit power of the second UE. $\rho_{ue2}$ indicates a ratio of energy per resource element EPRE of a physical downlink shared channel PDSCH of the second UE to EPRE of a cell-specific reference signal of the second UE, $\rho_{ue2}$ includes $\rho_{A,ue2}$ and $\rho_{B,ue2}$, and $\rho_{A,ue2}$ and $\rho_{B,ue2}$ correspond to different orthogonal frequency division multiplexing OFDM symbol indexes of the second UE. For a manner of determining the second transmit power by the first UE, refer to processing in Embodiment 13. Details are not described herein again.

In Embodiment 16 of the present invention, the first UE receives the adjustment parameter $\delta_{1,ue2}$, for the second transmit power, sent by the base station. The base station schedules the transmit power by using the adjustment parameter $\delta_{1,ue2}$ for the second transmit power, so that dynamic scheduling of a transmit power in a NOMA technology is implemented.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A base station to serve at least two user equipments (UEs) comprising a first UE and a second UE, and the base station comprising:
    a processor, configured to obtain power parameters of the first UE and an adjustment parameter $\delta_{1,ue1}$ for a first transmit power, wherein the power parameters of the first UE comprise a UE-specific parameter $P_{A,ue_1}$ of the first UE, a cell-specific parameter $P_{B,ue_1}$ of the first UE, and a reference signal transmit power of the first UE, and the first transmit power is a transmit power of downlink data for the first UE; and
    a transmitter, configured to send the power parameters of the first UE and the adjustment parameter $\delta_{1,ue1}$ for the first transmit power to the first UE; wherein
    the processor is further configured to:
        determine the first transmit power according to the power parameters of the first UE and the adjustment parameter $\delta_{1,ue1}$ for the first transmit power, and
        determine $\rho_{ue1}$ according to $P_{A,ue_1}$, $P_{B,ue_1}$, and the adjustment parameter $\delta_{1,ue1}$ for the first transmit power, and determine the first transmit power according to $\rho_{ue1}$ and the reference signal transmit power of the first UE, wherein $\rho_{ue1}$ indicates a ratio of energy per resource element (EPRE) of a physical downlink shared channel (PDSCH) of the first UE to EPRE of a cell-specific reference signal of the first UE, $\rho_{ue1}$ comprises $\rho_{A,ue1}$ and $\rho_{B,ue1}$, and $\rho_{A,ue1}$ and $\rho_{B,ue1}$ correspond to different orthogonal frequency division multiplexing (OFDM) symbol indexes of the first UE; and
    the transmitter is further configured to send the downlink data for the first UE at the first transmit power.

2. The base station according to claim 1, wherein the adjustment parameter $\delta_{1,ue1}$ for the first transmit power is an adjustment value for the first transmit power.

3. The base station according to claim 1, wherein the processor is configured to determine $\rho_{A,ue1}$ according to the following formulas:

$$\rho_{A,ue1} = \begin{cases} \delta_{power-offset} + \delta_{1,ue1} + P_{A,ue1} + 10\log_{10}(2) & \text{when transmit diversity based on four antenna ports is used for transmission;} \\ \delta_{power-offset} + \delta_{1,ue1} + P_{A,ue1} & \text{when transmit diversity based on four antenna ports is not used for transmission} \end{cases}$$

$$\delta_{power-offset} = \begin{cases} -10\log_{10}(2) & \text{when multi-user } MU\text{-}MIMO \text{ is used for transmission;} \\ 0 \text{ dB} & \text{when multi-user } MU\text{-}MIMO \text{ is not used for transmission} \end{cases}$$

and
    the processor is configured to determine $\rho_{B,ue1}$ according to $\rho_{A,ue1}$ and the following table:

| $P_{B,ue1}$ | $\rho_{B,ue1}/\rho_{A,ue1}$ | |
|---|---|---|
| | One antenna port | Two or four antenna ports |
| 0 | 1 | 5/4 |
| 1 | 4/5 | 1 |
| 2 | 3/5 | 3/4 |
| 3 | 2/5 | 1/2. |

4. The base station according to claim 1, wherein the processor is further configured to determine a second transmit power according to the power parameters of the first UE and the first transmit power, wherein the second transmit power is a transmit power of downlink data for the second UE; and
    the transmitter is further configured to send the downlink data for the second UE at the second transmit power.

5. A communication method applied to a communications network comprising at least two user equipments (UEs) comprising a first UE and a second UE, and the method comprising:
    obtaining, by a base station, power parameters of the first user equipment UE and an adjustment parameter $\delta_{1,ue1}$ for a first transmit power, wherein the power parameters of the first UE comprise a UE-specific parameter $P_{A,ue_1}$ of the first UE, a cell-specific parameter $P_{B,ue_1}$ of the first UE, and a reference signal transmit power of the first UE, and the first transmit power is a transmit power of downlink data for the first UE;
    sending, by the base station, the power parameters of the first UE and the adjustment parameter $\delta_{1,ue1}$ for the first transmit power to the first UE;
    determining, by the base station, the first transmit power according to the power parameters of the first UE and the adjustment parameter $\delta_{1,ue1}$ for the first transmit power, wherein the determining, by the base station, the first transmit power according to the power parameters of the first UE and the adjustment parameter $\delta_{1,ue1}$ for the first transmit power comprises:
        determining, by the base station, $\rho_{ue1}$ according to $P_{A,ue_1}$, $P_{B,ue_1}$, and the adjustment parameter $\delta_{1,ue1}$ for the first transmit power, and determining the first transmit power according to $\rho_{ue1}$ and the reference signal transmit power of the first UE; wherein $\rho_{ue1}$ indicates a ratio of energy per resource element (EPRE) of a physical downlink shared channel (PDSCH) of the first UE to EPRE of a cell-specific reference signal of the first UE; $\rho_{ue1}$ comprises $\rho_{A,ue1}$ and $\rho_{B,ue1}$, and $\rho_{A,ue1}$ and $\rho_{B,ue1}$ correspond to different orthogonal frequency division multiplexing (OFDM) symbol indexes of the first UE; and
    sending, by the base station, a downlink signal for the first UE at the first transmit power.

6. The method according to claim 5, wherein the adjustment parameter $\delta_{1,ue1}$ for the first transmit power is an adjustment value for the first transmit power.

7. The method according to claim 5, wherein the determining, by the base station, $\rho_{ue1}$ according to $P_{A,ue_1}$, $P_{B,ue_1}$ and the adjustment parameter $\delta_{1,ue1}$ for the first transmit power comprises:
    determining, by the base station, $\rho_{A,ue1}$ according to the following formulas:

$$\rho_{A,ue1} = \begin{cases} \delta_{power-offset} + \delta_{1,ue1} + P_{A,ue1} + 10\log_{10}(2) & \text{when transmit diversity based on four antenna ports is used for transmission;} \\ \delta_{power-offset} + \delta_{1,ue1} + P_{A,ue1} & \text{when transmit diversity based on four antenna ports is not used for transmission} \end{cases}$$

$$\delta_{power-offset} = \begin{cases} -10\log_{10}(2) & \text{when multi-user } MU\text{-}MIMO \text{ is used for transmission;} \\ 0 \text{ dB} & \text{when multi-user } MU\text{-}MIMO \text{ is not used for transmission} \end{cases}$$

and
determining, by the base station, $\rho_{B,ue1}$ according to $\rho_{A,ue1}$ and the following table:

| | $\rho_{B,ue1}/\rho_{A,ue1}$ | |
|---|---|---|
| $P_{B,ue1}$ | One antenna port | Two or four antenna ports |
| 0 | 1 | 5/4 |
| 1 | 4/5 | 1 |
| 2 | 3/5 | 3/4 |
| 3 | 2/5 | 1/2. |

8. The method according to claim 5, further comprising:
determining, by the base station, a second transmit power according to the power parameters of the first UE and the first transmit power, wherein the second transmit power is a transmit power of downlink data for the second UE; and
sending, by the base station, the downlink data for the second UE at the second transmit power.

9. A first user equipment (UE) to communicate with a base station, the base station serves at least two UEs, the at least two UEs comprise the first UE and a second UE, and the first UE comprising:
a receiver, configured to receive power parameters of the first UE and an adjustment parameter $\delta_{1,ue1}$ for a first transmit power that are sent by the base station, wherein the power parameters of the first UE comprise $P_{A,ue_1}$ of the first UE, a cell-specific parameter $P_{B,ue_1}$ of the first UE, and a reference signal transmit power of the first UE, and the first transmit power is a transmit power of downlink data for the first UE; and
a processor, configured to:
determine the first transmit power according to the power parameters of the first UE and the adjustment parameter $\delta_{1,ue1}$ for the first transmit power, determine a second transmit power according to the power parameters of the first UE and the first transmit power, wherein the second transmit power is a transmit power of downlink data for the second UE, and determine $\rho_{ue1}$ according to $P_{A,ue_1}$, $P_{B,ue_1}$ and the adjustment parameter $\delta_{1,ue1}$ for the first transmit power, and determine the first transmit power according to $\rho_{ue1}$ and the reference signal transmit power of the first UE, wherein $\rho_{ue1}$ indicates a ratio of energy per resource element (EPRE) of a physical downlink shared channel (PDSCH) of the first UE to EPRE of a cell-specific reference signal of the first UE, $\rho_{ue1}$ comprises $\rho_{A,ue1}$ and $\rho_{B,ue1}$, and $\rho_{A,ue1}$ and $\rho_{B,ue1}$ correspond to different orthogonal frequency division multiplexing (OFDM) symbol indexes of the first UE; wherein the receiver is further configured to receive a signal sent by the base station, wherein the received signal comprises the downlink data for the first UE; and the processor is further configured to obtain, according to the first transmit power and the second transmit power, the downlink data for the first UE from the signal received by the receiver.

10. The first UE according to claim 9, wherein the adjustment parameter $\delta_{1,ue1}$ for the first transmit power is an adjustment value for the first transmit power.

11. The first UE according to claim 9, wherein the processor is configured to determine $\rho_{A,ue1}$ according to the following formulas:

$$\rho_{A,ue1} = \begin{cases} \delta_{power-offset} + \delta_{1,ue1} + P_{A,ue1} + 10\log_{10}(2) & \text{when transmit diversity based on four antenna ports is used for transmission;} \\ \delta_{power-offset} + \delta_{1,ue1} + P_{A,ue1} & \text{when transmit diversity based on four antenna ports is not used for transmission} \end{cases}$$

$$\delta_{power-offset} = \begin{cases} -10\log_{10}(2) & \text{when multi-user } MU\text{-}MIMO \text{ is used for transmission;} \\ 0 \text{ dB} & \text{when multi-user } MU\text{-}MIMO \text{ is not used for transmission} \end{cases}$$

and the processor is configured to determine $\rho_{B,ue1}$ according to $\rho_{A,ue1}$ and the following table:

| $P_{B,ue1}$ | $\rho_{B,ue1}/\rho_{A,ue1}$ | |
| --- | --- | --- |
| | One antenna port | Two or four antenna ports |
| 0 | 1 | 5/4 |
| 1 | 4/5 | 1 |
| 2 | 3/5 | 3/4 |
| 3 | 2/5 | 1/2. |

12. The first UE according to claim 9, wherein the processor is configured to: determine a third transmit power according to the power parameters of the first UE, and determine the second transmit power according to the third transmit power and the first transmit power.

13. The first UE according to claim 12, wherein the second transmit power is a difference between the third transmit power and the first transmit power.

14. The first UE according to claim 12, wherein the processor is specifically configured to: determine $\rho_{ue1}$ according to $P_{A,ue_1}$ and $P_{B,ue_1}$, and determine the first transmit power according to $\rho_{ue1}$ and the reference signal transmit power of the first UE, wherein $\rho_{ue1}$ indicates a ratio of energy per resource element (EPRE) of a physical downlink shared channel (PDSCH) of the first UE to EPRE of a cell-specific reference signal of the first UE, $\rho_{ue1}$ comprises $\rho_{A,ue1}$ and $\rho_{B,ue1}$, and $\rho_{A,ue1}$ and $\rho_{B,ue1}$ correspond to different orthogonal frequency division multiplexing (OFDM) symbol indexes of the first UE.

* * * * *

UNITED STATES PATENT AND TRADEMARK OFFICE
CERTIFICATE OF CORRECTION

PATENT NO.         : 10,368,316 B2                                           Page 1 of 1
APPLICATION NO.    : 15/637343
DATED              : July 30, 2019
INVENTOR(S)        : Xingqing Cheng et al.

It is certified that error appears in the above-identified patent and that said Letters Patent is hereby corrected as shown below:

On the Title Page

Item (56):
In Foreign Patent Documents, delete "2011/176042" and insert -- 2013/176042 --, therefor.

In the Claims

Column 39, Line 19:
In Claim 14, after "processor is" delete "specifically."

Signed and Sealed this
Thirty-first Day of December, 2019

Andrei Iancu
*Director of the United States Patent and Trademark Office*